United States Patent
Hino et al.

(10) Patent No.: US 9,227,694 B2
(45) Date of Patent: Jan. 5, 2016

(54) BICYCLE DRIVE UNIT

(71) Applicant: Shimano Inc., Sakai, Osaka (JP)

(72) Inventors: Tetsuya Hino, Osaka (JP); Shinichiro Noda, Osaka (JP)

(73) Assignee: Shimano Inc., Osaka (JP)

( * ) Notice: Subject to any disclaimer, the term of this patent is extended or adjusted under 35 U.S.C. 154(b) by 146 days.

(21) Appl. No.: 13/955,363

(22) Filed: Jul. 31, 2013

(65) Prior Publication Data

US 2015/0038289 A1 Feb. 5, 2015

(51) Int. Cl.
*B62M 6/55* (2010.01)
*B62M 6/40* (2010.01)

(52) U.S. Cl.
CPC . *B62M 6/55* (2013.01); *B62M 6/40* (2013.01); *B62M 2700/003* (2013.01)

(58) Field of Classification Search
CPC ..... B62M 6/00; B62M 6/55; B62M 2700/003
USPC ........................... 74/575, 578, 665 B; 192/43
See application file for complete search history.

(56) References Cited

U.S. PATENT DOCUMENTS

| 4,174,642 | A | | 11/1979 | Martin et al. | |
|---|---|---|---|---|---|
| 4,410,060 | A | * | 10/1983 | Cunard | 180/206.4 |
| 5,845,727 | A | * | 12/1998 | Miyazawa et al. | 180/206.4 |
| 6,010,425 | A | * | 1/2000 | Tabe | 475/259 |
| 7,455,157 | B2 | * | 11/2008 | Kimes et al. | 192/46 |
| 7,475,763 | B2 | * | 1/2009 | Jegatheeson | 192/46 |

FOREIGN PATENT DOCUMENTS

| EP | 2 380 806 A2 | 10/2011 |
|---|---|---|
| JP | 4959858 B2 | 3/2012 |

* cited by examiner

*Primary Examiner* — William Kelleher
*Assistant Examiner* — Bobby Rushing, Jr.
(74) *Attorney, Agent, or Firm* — Global IP Counselors

(57) ABSTRACT

A bicycle drive unit includes a crank axle, a motor, an output member and a torque combining mechanism. The crank axle is rotatable about a first rotational axis. The motor has an output shaft rotatable about a second rotational axis. The output member is rotatable about the first rotational axis in a first rotational direction as the crank axle rotates about the first rotational axis in the first rotational direction. The torque combining mechanism operatively couples the output shaft of the motor to the output member to transmit rotation of the output shaft of the motor to the output member. The torque combining mechanism operatively separates the output shaft of the motor from the output member for preventing rotation of the crank axle from being transmitted to the output shaft of the motor as the crank axle rotates about the first rotational axis in a second rotational direction.

18 Claims, 9 Drawing Sheets

BICYCLE DRIVE UNIT

BACKGROUND

1. Field of the Invention

The present invention generally relates to a bicycle drive unit. In particular, the present invention relates to a drive unit for an electrically assisted bicycle.

2. Background Information

A coaster brake is conventionally known that is disposed on a bicycle (see European Patent Application Publication No. 2 380 806 A2 (Patent Citation 1) and Japanese Patent No. 4959858 (Patent Citation 2), for example). Generally, a bicycle crank arm and a front gear are non-rotatably coupled to each other. The coaster brake is disposed on a bicycle rear hub, and is operatively coupled to the front gear. Thus, when the bicycle crank arm is rotated in a rearward rotational direction, the coaster brake is operated.

On the other hand, an electrically assisted bicycle is conventionally known that uses a motor output as assisting power (see Japanese Laid-Open Patent Application Publication No. H08-310478 (Patent Citation 3), for example). In the electrically assisted bicycle, after a pedaling force which is inputted by the pedals is transmitted and the transmitted drive force is combined with a drive force from the motor, the combined drive force is transmitted to the rear wheel, thereby causing the rear wheel to rotate.

SUMMARY

It has been discovered that a coaster brake can not be merely applied to the electrically assisted bicycle. In particular, the Patent Citation 3 discloses a one-way clutch disposed between a crank arm and a front gear. The one-way clutch prevents a rotation of the crank arm in response to a rotation of an electric motor. However, it has been discovered that when the crank arm is rotated in a rearward rotational direction, the front gear does not rotate. Thus, even if the coaster brake is applied to the electrically assisted bicycle, the coaster brake can not be operated.

One aspect is to provide a bicycle drive unit that can be utilized with a bicycle coaster brake.

In accordance with a first aspect, a bicycle drive unit includes a crank axle, a motor, an output member, and a torque combining mechanism. The crank axle is rotatable about a first rotational axis. The motor has an output shaft rotatable about a second rotational axis. The output member is rotatable about the first rotational axis in a first rotational direction as the crank axle rotates about the first rotational axis in the first rotational direction. The torque combining mechanism operatively couples the output shaft of the motor to the output member to transmit rotation of the output shaft of the motor to the output member. The torque combining mechanism is configured to operatively separate the output shaft of the motor from the output member for preventing rotation of the crank axle from being transmitted to the output shaft of the motor as the crank axle rotates about the first rotational axis in a second rotational direction. The second rotational direction is opposite the first rotational direction.

In accordance with a second aspect, with the bicycle drive unit according to the first aspect, the output member is rotatable relative to the crank axle.

In accordance with a third aspect, with the bicycle drive unit according to the first aspect, the output member is rotatable about the first rotational axis in the second rotational direction as the crank axle rotates about the first rotational axis in the second rotational direction.

In accordance with a fourth aspect, with the bicycle drive unit according to the first aspect, the output member is configured to be attached to a front sprocket wheel.

In accordance with a fifth aspect, with the bicycle drive unit according to the first aspect, the torque combining mechanism includes a one-way clutch that is operatively disposed between the output shaft of the motor and the output member. The one-way clutch operatively couples the output shaft of the motor to the output member as the crank axle rotates about the first rotational axis in the first rotational direction. The one-way clutch operatively separates the output shaft of the motor from the output member for preventing the rotation of the crank axle from being transmitted to the output shaft of the motor as the crank axle rotates about the first rotational axis in the second rotational direction.

In accordance with a sixth aspect, with the bicycle drive unit according to the fifth aspect, the torque combining mechanism includes a torque transmission part rotatable about the first rotational axis. The torque transmission part is operatively coupled to the output shaft of the motor.

In accordance with a seventh aspect, with the bicycle drive unit according to the sixth aspect, the one-way clutch includes an engagement pawl pivotally arranged between a release position and an engagement position. The engagement pawl is configured to engage with a toothed portion of the torque transmission part of the torque combining mechanism as the crank axle rotates about the first rotational axis in the first rotational direction. The engagement pawl is configured to be disengaged from the toothed portion of the torque transmission part of the torque combining mechanism as the crank axle rotates about the first rotational axis in the second rotational direction.

In accordance with an eighth aspect, with the bicycle drive unit according to the seventh aspect, the one-way clutch further includes a biasing member biasing the engagement pawl towards the engagement position.

In accordance with a ninth aspect, with the bicycle drive unit according to the sixth aspect, the one-way clutch includes an engagement member pivotally arranged between a release position and an engagement position. The engagement member is configured to frictionally engage with an inner peripheral surface of the torque transmission part of the torque combining mechanism as the crank axle rotates about the first rotational axis in the first rotational direction. The engagement member is configured to be at least frictionally disengaged from the inner peripheral surface of the torque transmission part of the torque combining mechanism as the crank axle rotates about the first rotational axis in the second rotational direction.

In accordance with a tenth aspect, with the bicycle drive unit according to the ninth aspect, the one-way clutch further includes a biasing member biasing the engagement member towards the release position.

In accordance with an eleventh aspect, the bicycle drive unit according to the tenth aspect further includes a control part configured to move the engagement member towards the engagement position as the crank axle rotates about the first rotational axis in the first rotational direction.

In accordance with a twelfth aspect, the bicycle drive unit according to the eleventh aspect further includes a contact part configured to transmit the rotation of the crank axle to the output member as the crank axle rotates about the first rotational axis in the second rotational direction.

In accordance with a thirteenth aspect, with the bicycle drive unit according to the seventh aspect, the one-way clutch further includes a biasing member biasing the engagement pawl towards the engagement position.

In accordance with a fourteenth aspect, the bicycle drive unit according to the thirteenth aspect further includes a control part configured to move the engagement pawl towards the release position as the crank axle rotates about the first rotational axis in the second rotational direction.

In accordance with a fifteenth aspect, with the bicycle drive unit according to the fourteenth aspect, the control part has a contact surface that circumferentially contacts with an inside surface of an recess part of the output member to transmit the rotation of the crank axle to the output member as the crank axle rotates about the first rotational axis in the second rotational direction.

In accordance with a sixteenth aspect, with the bicycle drive unit according to the thirteenth aspect, the toothed portion is disposed on an inner peripheral surface of the torque transmission part of the torque combining mechanism.

In accordance with a seventeenth aspect, with the bicycle drive unit according to the thirteenth aspect, the toothed portion is disposed on an outer peripheral surface of the torque transmission part of the torque combining mechanism.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
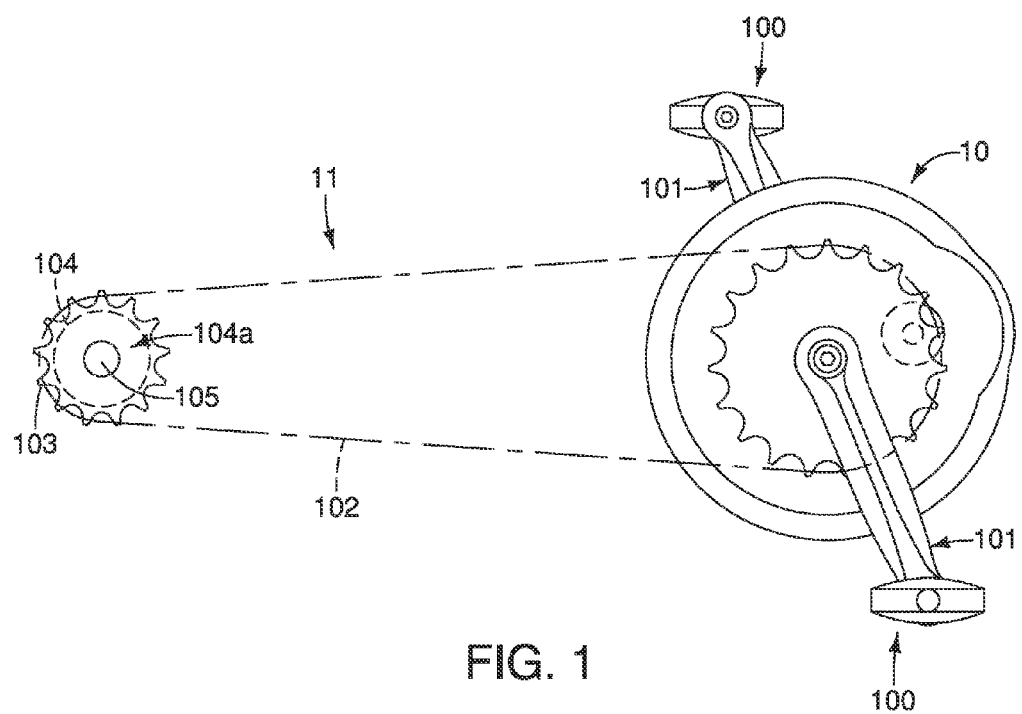
FIG. 1 is a side elevational view of a drive train of an electrically assisted bicycle that is equipped with a drive unit in accordance with a first embodiment.
Figure 2:
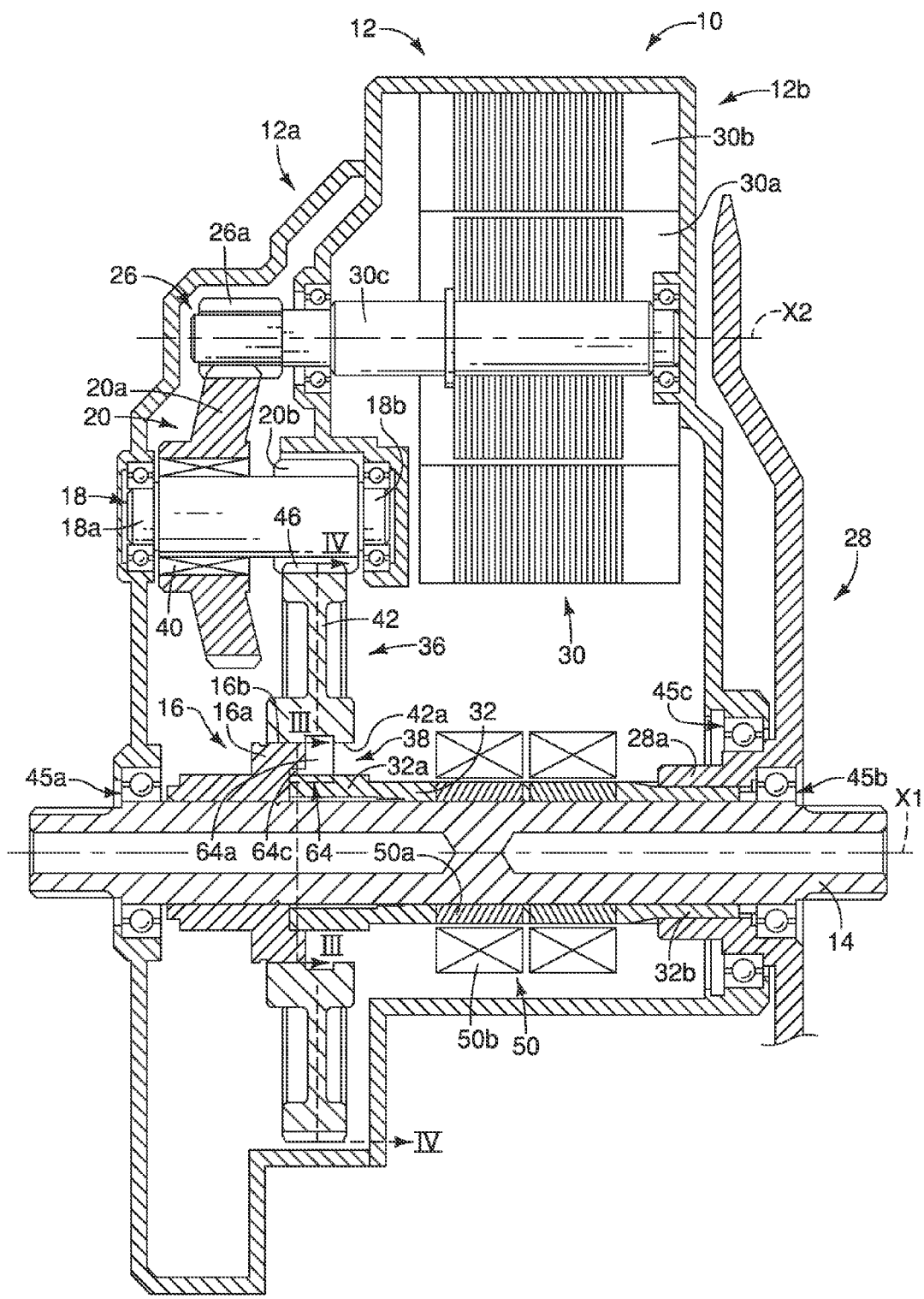
FIG. 2 is a cross-sectional view of the drive unit in accordance with the first embodiment.

Referring initially to FIGS. 1 and 2, a drive unit 10 (e.g., a bicycle drive unit) is illustrated in accordance with a first embodiment. As illustrated in FIG. 1, the drive unit 10 is disposed on a drive train 11 of an electrically assisted bicycle. In the illustrated embodiment, FIG. 1 only illustrates portions related to the drive train 11 of the electrically assisted bicycle since other portions of the electrically assisted bicycle can be conventional. Thus, detailed description of the electrically assisted bicycle will be omitted for the sake of brevity. As illustrated in FIG. 1, the drive train 11 basically includes a pair of pedals 100, a pair of crank arms 101, the drive unit 10, a first chain 102, a rear sprocket 103 and a rear hub 104. The pedals 100 are rotatably mounted to the free ends of the crank arms 101, respectively. The inner ends of the crank arms 101 are fixed to opposite ends of a crank axle 14 (see FIG. 2) of the drive unit 10, respectively. The first chain 102 is operatively connected between the drive unit 10 and the rear sprocket 103. For the drive train 11 of the electrically assisted bicycle, pedaling force acting on the pedals 100 is transmitted to the rear hub 104 that is rotatably coupled to a rear hub axle 105 to rotate a rear wheel (not shown) of the electrically assisted bicycle via the following transmission passage: the crank arms 101→the drive unit 10→the first chain 102→the rear sprocket 103→the rear hub 104. While transmitting the pedaling force, the drive unit 10 synthesizes a motor output torque as an assisting power for assisting the pedaling force. In the illustrated embodiment, when a pedaling force more than a prescribed threshold is detected, then the motor output torque corresponding to the pedaling force is generated as the assisting power. The drive unit 10 is usually arranged in a vicinity of a connecting section between a seat tube (not shown) of a bicycle frame and a down tube (not shown) of the bicycle frame. A battery for the drive unit 10 is arranged along a rear carrier, the down tube or the seat tube.

In the illustrated embodiment, the rear hub 104 is equipped with a coaster brake 104a. The coaster brake 104a is operated for generating a braking force to the rear wheel via the rear hub 104 in response to a rearward rotation of the crank arms 101. In particular, in the illustrated embodiment, the coaster brake 104a of the rear hub 104 is operated in response to the rearward rotation of the crank arms 101 via the drive unit 10, the first chain 102 and the rear sprocket 103. Since coaster brakes are conventionally well known, the detailed description will be omitted for the sake of brevity.

As illustrated in FIG. 1, the drive unit 10 is arranged in a vicinity of the crank arms 101. In the illustrated embodiment, as shown in FIG. 2, the drive unit 10 has a housing 12, the crank axle 14, a first rotation transmitting member 16, an intermediate axle 18, a second rotation transmitting member 20, a third rotation transmitting member 26 and a front sprocket 28 (e.g., a front sprocket wheel). In the illustrated embodiment, the crank axle 14 and the intermediate axle 18 are arranged to extend parallel to each other at spaced locations. As shown in FIG. 2, the drive unit 10 has a motor 30, an output member 32, and a torque combining mechanism 36 with a one-way clutch 38. Thus, the bicycle drive unit 10 includes the crank axle 14, the motor 30, the output member 32, and the torque combining mechanism 36.

As shown in FIG. 2, the housing 12 accommodates the first rotation transmitting member 16, the second rotation transmitting member 20, the third rotation transmitting member 26, the motor 30, the output member 32, and the torque combining mechanism 36 with the one-way clutch 38.

The housing 12 is a member made of, for example, aluminum or another metal. However, a part or the entire of the housing 12 can also be made of a synthetic resin. The housing 12 has a first side part 12a and a second side part 12b. The first side part 12a and the second side part 12b are independently formed as separate parts, and face with each other in an axial direction of the crank axle 14. The first side part 12a and the second side part 12b are detachably coupled to each other in a conventional manner to form an accommodating space for accommodating the first rotation transmitting member 16, the second rotation transmitting member 20, the third rotation transmitting member 26, the motor 30, the output member 32, and the torque combining mechanism 36 with the one-way clutch 38.

The crank axle 14 is a metal axle member made of, for example, iron, stainless steel, or the like. The crank axle 14 is rotatable about a first rotational axis X1. The crank axle 14 is rotatably supported with respect to the housing 12 by first, second and third bearings 45a, 45b and 45c, such as ball bearings. The first bearing 45a is radially disposed between the first side part 12a and the crank axle 14 in the opening of the first side part 12a. The second bearing 45b is radially disposed between the front sprocket 28 and the crank axle 14 in a center hole of a sleeve 28a of the front sprocket 28. The third bearing 45c is radially disposed between the second side part 12b and the front sprocket 28 on an outer peripheral surface of the sleeve 28a of the front sprocket 28. The two ends of the crank axle 14 are arranged to protrude out from the first side part 12a and the second side part 12b, respectively. On the end portions of the crank axle 14, the crank arms 101 are detachably and non-rotatably coupled to the crank axle 14, respectively. In the end portion of the crank axle 14 on the first side part 12a side, the crank axle 14 has a serration section for connecting with the first rotation transmitting member 16. The serration section is formed on the entire circumference in the circumferential direction of the crank axle 14. Of course, alternatively, the serration section can be formed intermittently in the circumferential direction of the crank axle 14.

The first rotation transmitting member 16 is non-rotatably coupled to the crank axle 14 such that the first rotation transmitting member 16 transmits the rotation of the crank arms 101. The first rotation transmitting member 16 is made of, for example, a synthetic resin or a metal. The first rotation transmitting member 16 is connected to the serration section of the crank axle 14 such that the first rotation transmitting member 16 and the crank axle 14 rotate together. Of course, the first rotation transmitting member 16 can be fastened to the crank axle 14 by press-fit, bonding or another appropriate fastening manner. The first rotation transmitting member 16 is basically a tubular member with a flange portion 16a. The configurations of the first rotation transmitting member 16 will be further described in detail later.

The intermediate axle 18 is an axle member made of iron, stainless steel or another metal. The intermediate axle 18 has first and second end portions 18a and 18b. The first and second end portions 18a and 18b are rotatably supported to the first and second side parts 12a and 12b by a pair of bearings, such as a ball bearing, respectively. The intermediate axle 18 rotatably supports the second rotation transmitting member 20.

The second rotation transmitting member 20 is operatively disposed between the third rotation transmitting member 26 and the torque combining mechanism 36. The second rotation transmitting member 20 is a member that transmits the rotation of the motor 30 to the torque combining mechanism 36. The second rotation transmitting member 20 has a large gear 20a and a small gear 20b that has a smaller diameter than that of the large gear 20a. The large gear 20a and the small gear 20b are a member made of, for example, a synthetic resin or a metal. The large gear 20a is rotatably supported on the intermediate axle 18 near the first end portion 18a via a one-way clutch 40. The one-way clutch 40 only transmits the rotation of the motor 30 in a direction for assisting the pedaling force in a forward rotation of the crank arms 101. In the illustrated embodiment, the one-way clutch 40 is configured to be a roller clutch. Of course, in the illustrated embodiment, the one-way clutch 40 can be disposed between an output shaft 30c of the motor 30 and a third rotation transmitting member 26 instead of being disposed between the intermediate axle 18 and the large gear 20a. In this case, the large gear 20a is fixedly coupled to the intermediate axle 18. The small gear 20b is fixedly coupled to the intermediate axle 18 near the second end portion 18b.

The third rotation transmitting member 26 is operatively disposed between the motor 30 and the second rotation transmitting member 20. The third rotation transmitting member 26 is a member that transmits the rotation of the motor 30 to the second rotation transmitting member 20. The third rotation transmitting member 26 has an externally toothed gear 26a that is fixedly coupled to the output shaft 30c of the motor 30. The gear 26a of the third rotation transmitting member 26 meshes with the large gear 20a of the second rotation transmitting member 20.

The front sprocket 28 has a bicycle front sprocket with a conventional structure. The front sprocket 28 is rotatably supported to the crank axle 14 by the second bearing 45b. The front sprocket 28 is also rotatably supported to the housing 12 by the third bearing 45c. The front sprocket 28 is rotatable about the first rotational axis X1 of the crank axle 14. Thus, the rotational axis of the crank axle 14 and the rotational axis of the front sprocket 28 are coincident with each other. In the illustrated embodiment, the front sprocket 28 is integrally formed as a one-piece, unitary member. However, of course, the front sprocket 28 can be formed by a plurality of separate parts. For example, the front sprocket 28 can include a conventional spider with the sleeve 28a, and a conventional ring chain wheel attached to the spider in a conventional manner. The front sprocket 28 can be fixed on the output member 32 without support of the crank axle 14. The second bearing 45b can be disposed between the output member 32 and the housing 12. The third bearing 45c can be disposed between the crank axle 14 and the output member 32.

The motor 30 is an inner rotor-type motor. The motor 30 has a rotor 30a and a stator 30b. Since the motor 30 has a conventional configuration, the detailed description will be omitted for the sake of brevity. The stator 30b is fixedly coupled to an inner side surface of the second side part 12b of the housing 12. The motor 30 also has the output shaft 30c. The rotor 30a is fixedly coupled to the output shaft 30c of the motor 30. The output shaft 30c is rotatably supported relative to the housing 12 by a pair of bearings. Specifically, the output shaft 30c is rotatable about a second rotational axis X2. In the illustrated embodiment, the second rotational axis X2 is arranged to extend parallel to the first rotational axis X1 at spaced locations.

In the illustrated embodiment, the gear 26a of the third rotation transmitting member 26 is fixedly coupled to a distal end of the output shaft 30c of the motor 30. The gear 26a meshes with the large gear 20a of the second rotation transmitting member 20. The large gear 20a is rotatably coupled to the intermediate axle 18 via the one-way clutch 40. The one-way clutch 40 only transmits rotational output of the motor 30 for the forward rotation of the front sprocket 28 to the intermediate axle 18. The small gear 20b is fixedly coupled to the intermediate axle 18.

The output member 32 is a cylindrical member that axially extends along the first rotational axis X1. The output member 32 has a first end portion 32a that is selectively engaged with the first rotation transmitting member 16, and a second end portion 32b that is non-rotatably coupled to the sleeve 28a of the front sprocket 28. In other words, the output member 32 is configured to be attached to the front sprocket 28. Thus, the front sprocket 28 and the output member 32 rotate together. The output member 32 also has a torque sensor 50 with a pair of magnetic deflection elements 50a and a pair of coils 50b. The magnetic deflection elements 50a and the coils 50b radially face with each other, respectively. The torque detected by the torque sensor 50 is used to control the rotational output of the motor 30. Of course, it will be apparent to those skilled in the art from this disclosure that the torque sensor 50 can be other type of torque sensors.

The output member 32 is rotatably supported to the crank axle 14. Specifically, the output member 32 is rotatable relative to the crank axle 14. The output member 32 is rotatable about the first rotational axis X1 in a forward rotational direction (e.g., a first rotational direction) as the crank axle 14 rotates about the first rotational axis X1 in the forward rotational direction (e.g., the first rotational direction). On the other hand, the output member 32 is rotatable about the first rotational axis X1 in a rearward rotational direction (e.g., a second rotational direction) as the crank axle 14 rotates about the first rotational axis X1 in the rearward rotational direction (e.g., the second rotational direction). The rearward rotational direction (e.g., the second rotational direction) is opposite the forward rotational direction (e.g., the first rotational direction). In particular, the output member 32 is rotatable relative to the crank axle 14 and the first rotation transmitting member 16 within a limited range of relative rotation. Specifically, the output member 32 is engaged with the first rotation transmitting member 16 and the torque combining mechanism 36 to rotate together with the first rotation transmitting member 16 and the torque combining mechanism 36 in the forward rotational direction as the crank axle 14 rotates in the forward rotational direction. On the other hand, the output member 32 is engaged with the first rotation transmitting member 16 to rotate together with the first rotation transmitting member 16 in a rearward rotational direction (e.g., a second rotational direction) as the crank axle 14 rotates about the first rotational axis X1 in the rearward rotational direction. The configuration of the output member 32 will be described in detail later.

The torque combining mechanism 36 is operatively disposed between the motor 30 and the output member 32. The torque combining mechanism 36 operatively couples the output shaft 30c of the motor 30 to the output member 32 to transmit rotation of the output shaft 30c of the motor 30 to the output member 32. The torque combining mechanism 36 is configured to operatively separate the output shaft 30c of the motor 30 from the output member 32 for preventing rotation of the crank axle 14 from being transmitted to the output shaft 30c of the motor 30 as the crank axle 14 rotates about the first rotational axis X1 in the rearward rotational direction (e.g., the second rotational direction).

Specifically, the torque combining mechanism 36 has the one-way clutch 38. The torque combining mechanism 36 also has a torque transmission part 42. The torque transmission part 42 is rotatable about the first rotational axis X1. The torque transmission part 42 is operatively coupled to the output shaft 30c of the motor 30. More specifically, the torque transmission part 42 is rotatably supported on an outer peripheral surface 16b of the flange portion 16a of the first rotation transmitting member 16. Thus, the first rotation transmitting member 16 does not directly transmit the rotation of the crank axle 14 to the torque transmission part 42. The torque transmission part 42 has an outer gear 46 on an outer peripheral surface of the torque transmission part 42. The outer gear 46 meshes with the small gear 20b of the second rotation transmitting member 20. Thus, the torque transmission part 42 transmits the rotation of the motor 30. The torque transmission part 42 is rotatably coupled to the output member 32 via the one-way clutch 38. The second rotation transmitting member 20, the third rotation transmitting member 26 and the torque transmission part 42 can form a reduction mechanism.

The one-way clutch 38 is disposed between an inner peripheral surface 42a of the torque transmission part 42 and the first end portion 32a of the output member 32. In other words, the one-way clutch 38 is operatively disposed between the output shaft 30c of the motor 30 and the output member 32. The one-way clutch 38 only transmits the rotation of the motor 30 to the output member 32 while the crank axle 14 rotates in the forward rotational direction. The torque combining mechanism 36 combines the rotational output of the motor 30 transmitted to the outer gear 46 of the torque transmission part 42 and the rotational output of the crank axle 14 transmitted from the first rotation transmitting member 16 via the one-way clutch 38. Specifically, the one-way clutch 38 operatively couples the output shaft 30c of the motor 30 to the output member 32 as the crank axle 14 rotates about the first rotational axis X1 in the forward rotational direction (e.g., the first rotational direction). On the other hand, the one-way clutch 38 operatively separates the output shaft 30c of the motor 30 from die output member 32 for preventing the rotation of the crank axle 14 from being transmitted to the output shaft 30c of the motor 30 as the crank axle 14 rotates about the first rotational axis X1 in the rearward rotational direction (e.g., the second rotational direction).

Referring now to FIGS. 3A, 3B, 4A and 4B, the configuration of the one-way clutch 38 will be further described in detail. The one-way clutch 38 includes an internally toothed portion 60, an engagement pawl 64, and a biasing member 66. The one-way clutch 38 also includes a control part 68.

The toothed portion 60 is disposed on the inner peripheral surface 42a of the torque transmission part 42. The toothed portion 60 has a plurality of engagement teeth 60a formed on the inner peripheral surface 42a of the torque transmission part 42. The engagement teeth 60a have engagement faces 60b that selectively engage with the engagement pawl 64 for transmitting the rotation of the motor 30 to the output member 32.

The engagement pawl 64 is pivotally mounted to the first end portion 32a of the output member 32. The engagement pawl 64 is pivotally arranged between a release position (see FIGS. 3A and 4A) and an engagement position (see FIGS. 3B and 4B). The engagement pawl 64 is configured to engage with the toothed portion 60 as the crank axle 14 rotates about the first rotational axis X1 in the forward rotational direction e.g., the first rotational direction or a clockwise direction in FIGS. 3B and 4B). The engagement pawl 64 is configured to be disengaged from the toothed portion 60 as the crank axle 14 rotates about the first rotational axis X1 in the rearward rotational direction (e.g., the second rotational direction or a counter-clockwise direction in FIGS. 3A and 4A). In the illustrated embodiment, the "disengagement" of the engagement pawl 64 from the toothed portion 60 does not necessarily require that the engagement pawl 64 is spaced apart from the toothed portion 60. Rather, it can mean that the engagement pawl 64 slides over the toothed portion 60 while contacting with the toothed portion 60. In this case, the engagement pawl 64 is disengaged from the toothed portion 60 for preventing the rotation of the crank axle 14 from being transmitted to the output shaft 30c of the motor 30 as the crank axle 14 rotates about the first rotational axis X1 in the rearward rotational direction (e.g., the second rotational direction). However it is preferable that the engagement pawl 64 is mechanically spaced apart from the toothed portion 60 to reduce mechanical loss when the crank axle 14 rotates about the first rotational axis X1 in the rearward rotational direction.

The engagement pawl 64 has an engagement end 64a, a support end 64b and a control end 64c. The engagement end 64a is engaged with the engagement teeth 60a of the toothed portion 60 while the engagement pawl 64 is located at the engagement position. The engagement end 64a is disengaged from the engagement teeth 60a of the toothed portion 60 while the engagement pawl 64 is located at the release position. The engagement pawl 64 is pivotally mounted to an outer peripheral surface 32c of the first end portion 32a of the output member 32 in a conventional manner. For example, the support end 64b of the engagement pawl 64 is pivotally coupled to a pivot pin that is disposed on the first end portion 32a of the output member 32. The control end 64c axially protrudes from the engagement end 64a of the engagement pawl 64. The control end 64c is operated by the control part 68 such that the engagement pawl 64 pivots between the release position and the engagement position. In the illustrated embodiment, the one-way clutch 38 includes single engagement pawl 64. However, it will be apparent to those skilled in the art from this disclosure that the one-way clutch 38 includes a plurality of engagement pawls.

The biasing member 66 biases the engagement pawl 64 towards the engagement position. The biasing member 66 basically includes a pawl spring operatively disposed between the engagement pawl 64 and the output member 32. In the illustrated embodiment, the one-way clutch 38 includes single biasing member 66. However, it will be apparent to those skilled in the art from this disclosure that the one-way clutch 38 includes a plurality of biasing members corresponding to a plurality of engagement pawls.

Figure 3A:
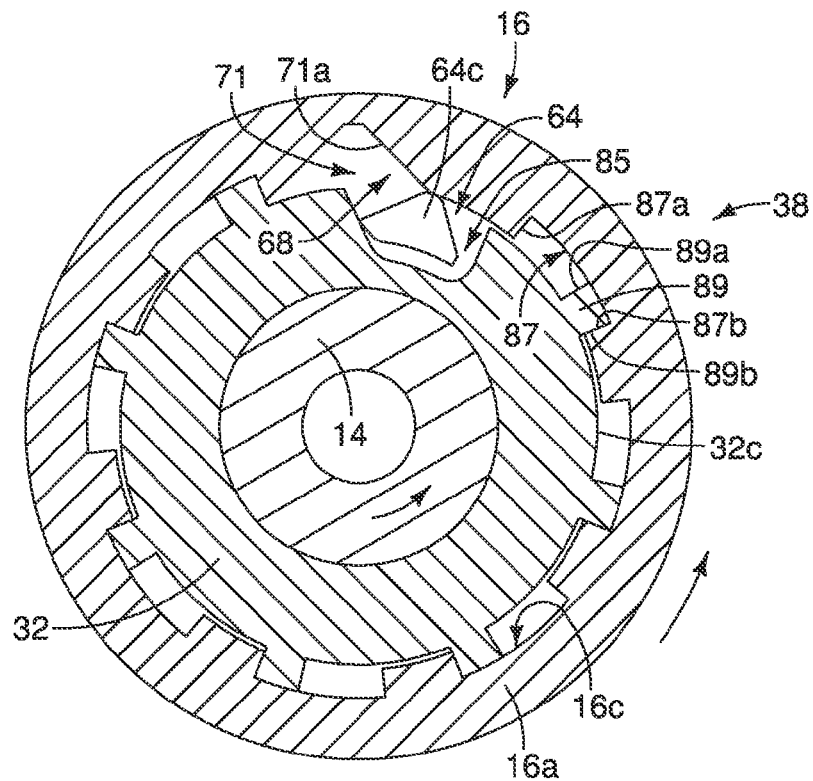
FIG. 3A is an enlarged cross-sectional view of a clutch mechanism of the drive unit illustrated in FIG. 2, taken along III-III line in FIG. 2, illustrating an engagement pawl moved towards a release position of the engagement pawl.
Figure 3B:
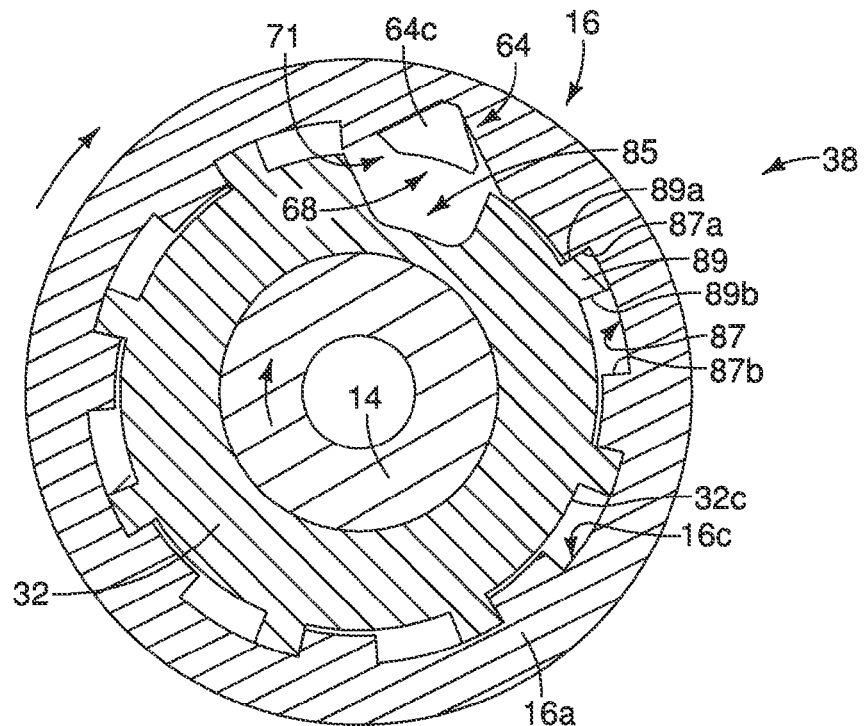
FIG. 3B is an enlarged cross-sectional view of the clutch mechanism of the drive unit illustrated in FIG. 2, taken along III-III line in FIG. 2, illustrating the engagement pawl moved towards an engagement position of the engagement pawl.
Figure 4A:
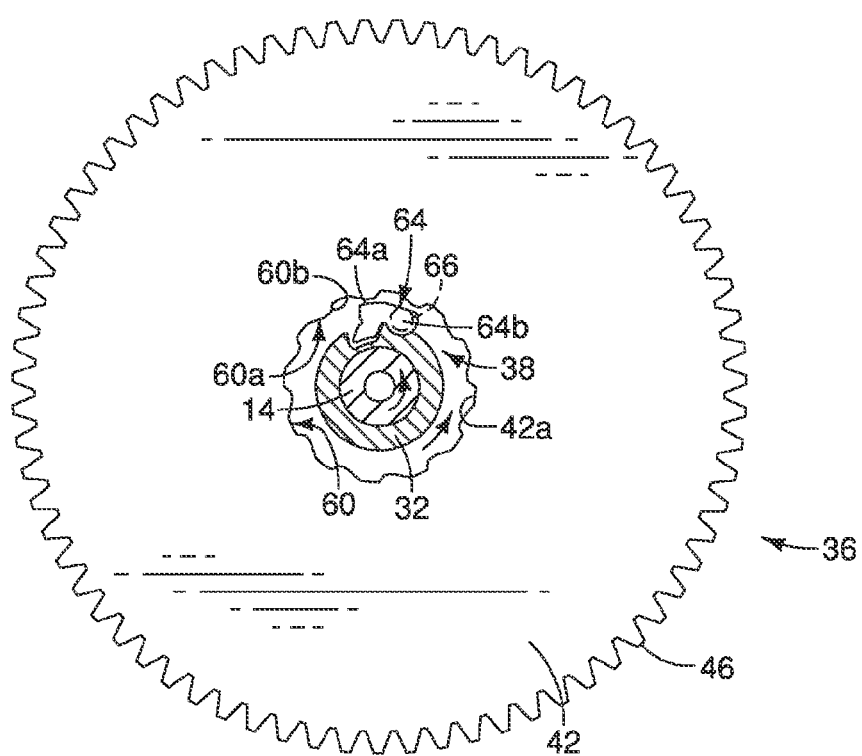
FIG. 4A is a cross-sectional view of the clutch mechanism of the drive unit illustrated in FIG. 2, taken along IV-IV line in FIG. 2, illustrating the engagement pawl moved towards the release position of the engagement pawl.
Figure 4B:
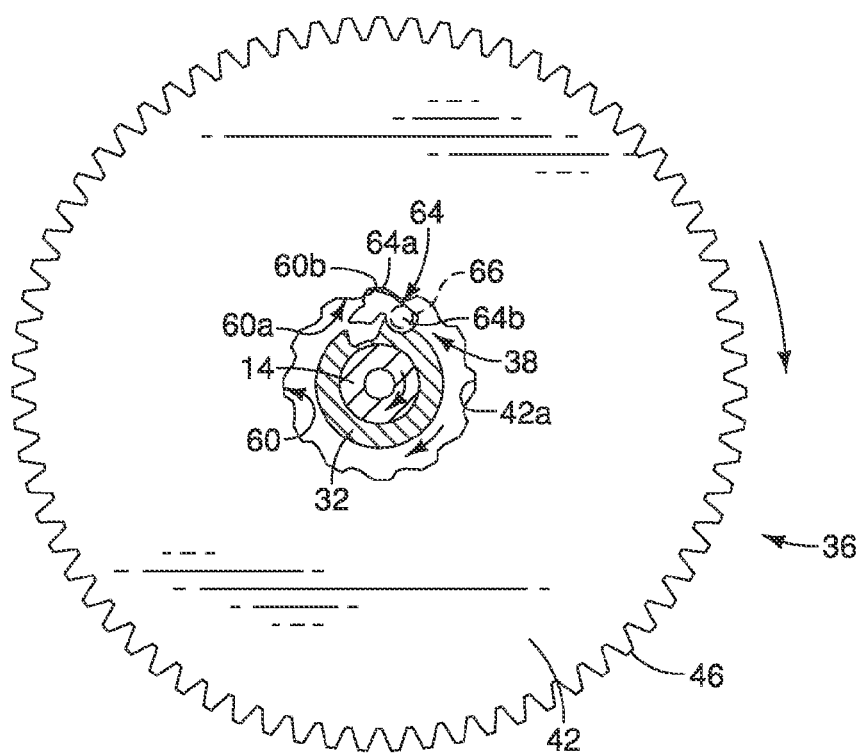
FIG. 4B is a cross-sectional view of the clutch mechanism of the drive unit illustrated in FIG. 2, taken along IV-IV line in FIG. 2, illustrating the engagement pawl moved towards the engagement position of the engagement pawl.

The control part 68 is disposed on an inner peripheral surface 16c of the flange portion 16a of the first rotation transmitting member 16. Specifically, the control part 68 has a recess portion 71 with a slanted surface 71a. The recess portion 71 is formed in the inner peripheral surface 16c of the flange portion 16a. The slanted surface 71a of the recess portion 71 is slanted relative to a radial direction of the first rotational axis X1 of the crank axle 14. As shown in FIGS. 3A and 3B, the output member 32 has a depressed portion 85 on the outer peripheral surface 32c of the first end portion 32a of the output member 32. The depressed portion 85 is circumferentially disposed at a location corresponding to the recess portion 71. The control end 64c of the engagement pawl 64 slides along the slanted surface 71a of the recess portion 71 while the first rotation transmitting member 16 rotates relative to the output member 32. Specifically, as shown in FIG. 3B, the control end 64c of the engagement pawl 64 is disposed inside the recess portion 71 when the crank axle 14 rotates in the forward rotational direction and the first rotation transmitting member 16 rotates in the forward rotational direction with respect to the output member 32. This moves the engagement pawl 64 towards the engagement position, as shown in FIG. 4B. On the other hand, as shown in FIG. 3A, the control end 64c of the engagement pawl 64 is disposed outside the recess portion 71 and inside the depressed portion 85 when the crank axle 14 rotates in the rearward rotational direction and the first rotation transmitting member 16 rotates in the rearward rotational direction with respect to the output member 32. This moves the engagement pawl 64 towards the release position, as shown in FIG. 4A.

Furthermore, as shown in FIGS. 3A and 3B, the first rotation transmitting member 16 has a plurality of recesses 87 on the inner peripheral surface 16c of the flange portion 16a. The recesses 87 are circumferentially arranged on the inner peripheral surface 16c of the flange portion 16a. On the other hand, the output member 32 has a plurality of projections 89 on the outer peripheral surface 32c of the first end portion 32a. The projections 89 are circumferentially arranged on the outer peripheral surface 32c of the first end portion 32a. The recesses 87 and the projections 89 are arranged relative to each other with circumferential spacing therebetween, respectively, to provide the limited range of relative rotation between the first rotation transmitting member 16 and the output member 32.

In the illustrated embodiment, as shown in FIGS. 3A and 3B, each of the recesses 87 has first and second inside surfaces 87a and 87b, while each of the projections 89 has first and second contact surfaces 89a and 89b.

As shown in FIG. 3B, the first inside surfaces 87a of the recesses 87 circumferentially contact with first contact surfaces 89a of the projections 89, respectively, as the crank axle 14 rotates in the forward rotational direction. Furthermore, as the crank axle 14 rotates in the forward rotational direction, the one-way clutch 38 operatively couples the torque transmission part 42 to the output member 32. However, while the pedalling force detected by the torque sensor 50 is less than a prescribed threshold, the motor output torque of the motor 30 is not generated even if the crank axle 14 rotates in the forward rotational direction. In this case, the first inside surfaces 87a of the recesses 87 of the first rotation transmitting member 16 contact with the first contact surfaces 89a of the projections 89 of the output member 32, respectively, such that the rotation of the crank axle 14 in the forward rotational direction is transmitted from the first rotation transmitting member 16 to the output member 32. Furthermore, while the pedalling force detected by the torque sensor 50 is more than the prescribed threshold, the motor output torque of the motor 30 is generated as an assisting power for assisting the pedalling force when the crank axle 14 rotates in the forward rotational direction. In this case, the first inside surfaces 87a of the recesses 87 of the first rotation transmitting member 16 contact with the first contact surfaces 89a of the projections 89 of the output member 32, respectively, such that the motor output torque of the motor 30 is transmitted to the output member 32 via the torque transmission part 42 and the one-way clutch 38.

On the other hand, as shown in FIG. 3A, the second inside surfaces 87b of the recesses 87 circumferentially contact with second contact surfaces 89b of the projections 89, respectively, as the crank axle 14 rotates in the rearward rotational direction. Furthermore, as the crank axle 14 rotates in the rearward rotational direction, the one-way clutch 38 operatively separates the torque transmission part 42 from the output member 32 for preventing the rotation of the crank axle 14 from being transmitted to the output shaft 30c of the motor 30 via the torque transmission part 42. When the crank axle 14 rotates in the rearward rotational direction, the second inside surfaces 87b of the recesses 87 of the first rotation transmitting member 16 contact with the second contact surfaces 89b of the projections 89 of the output member 32, respectively, such that the rotation of the crank axle 14 in the rearward rotational direction is directly transmitted from the first rotation transmitting member 16 to the output member 32.

With this drive unit 10, the torque generated by the pedaling force in the forward rotational direction is transmitted in the following transmission passage: the crank arms 101→the crank axle 14→the first rotation transmitting member 16→the output member 32→the front sprocket 28. Furthermore, the output torque of the motor 30 for assisting the pedaling force in the forward rotational direction is transmitted in the following path: the third rotation transmitting member 26→the second rotation transmitting member 20→the torque transmission part 42→the one-way clutch 38→the output member 32→the front sprocket 28.

On the other hand, with this drive unit 10, the rearward rotation of the crank arms 101 is also transmitted to the front sprocket 28 to rotate the front sprocket 28 in the rearward rotational direction. Specifically, the torque generated by the pedaling force in the rearward rotational direction is also transmitted in the following transmission passage: the crank arms 101→the crank axle 14→the first rotation transmitting member 16→the output member 32→the front sprocket 28. The rearward rotation of the crank arms 101 is not transmitted to the torque transmission part 42 of the torque combining mechanism 36 by the operation of the one-way clutch 38.

Figure 5A:
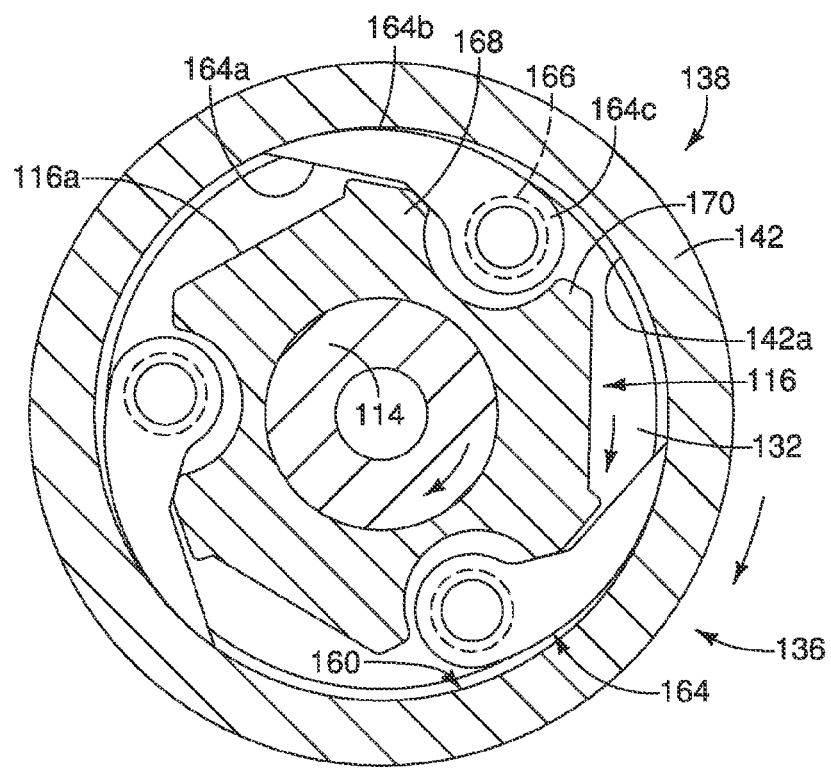
FIG. 5A is a cross-sectional view of a modified clutch mechanism of the drive unit in accordance with the first embodiment, illustrating an engagement pawl moved towards an engagement position of the engagement pawl.
Figure 5B:
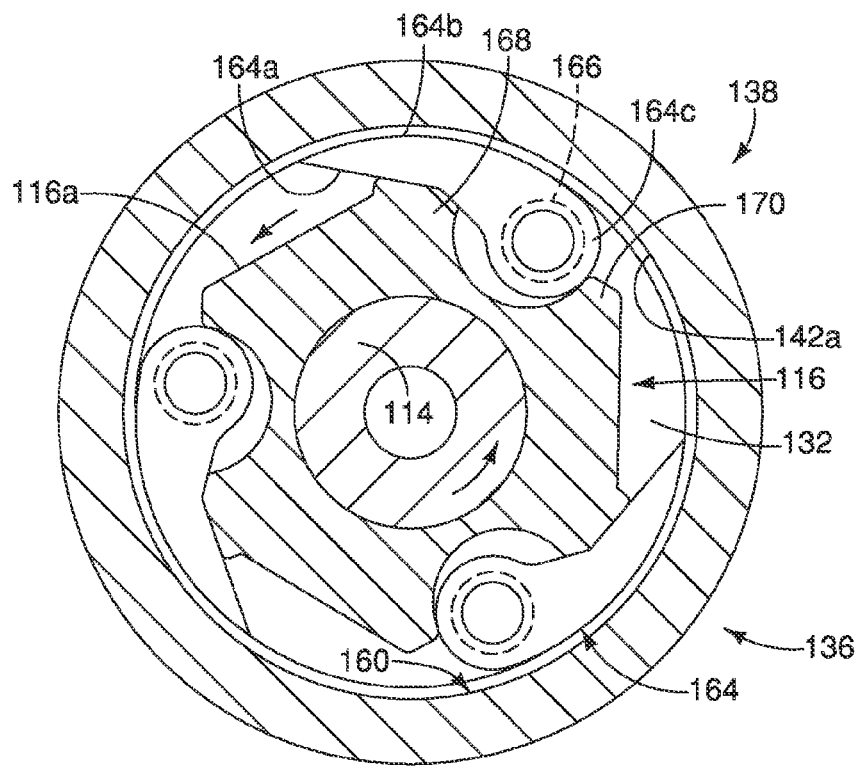
FIG. 5B is a cross-sectional view of the modified clutch mechanism illustrated in FIG. 5A, illustrating the engagement pawl moved towards a release position of the engagement pawl.

In the illustrated embodiment, the drive unit 10 includes the one-way clutch 38 for selectively coupling the motor 30 to the front sprocket 28. However, the drive unit 10 can include a different one-way clutch from the one-way clutch 38. Referring now to FIGS. 5A and 5B, a one-way clutch 138 will be described in detail, as a modified example of the one-way clutch 38 in accordance with the first embodiment. As shown in FIGS. 5A and 5B, the one-way clutch 138 includes a friction engagement portion 160, a plurality of (three in this embodiment) engagement pawls 164 (e.g., engagement members), and a plurality of (three in this embodiment) biasing members 166. The one-way clutch 138 also includes a plurality of (three in this embodiment) control parts 168 and a plurality of (three in this embodiment) contact parts 170. Of course, it will be apparent to those skilled in the art from this disclosure that the numbers of the engagement pawls 164, the biasing members 166, the control parts 168 and the contact parts 170 can be less than or more than three, as needed and/or desired.

The friction engagement portion 160 is disposed on a cylindrical inner peripheral surface 142a of a torque transmission part 142. The torque transmission part 142 is basically identical to the torque transmission part 42, except that the torque transmission part 142 includes a non-toothed cylindrical inner peripheral surface 142a. The torque transmission part 142 is operatively coupled to the motor 30. The friction engagement portion 160 selectively and frictionally engages with the engagement pawls 164 for transmitting the rotation of the motor 30 to an output member 132. The output member 132 is also basically identical to the output member 32, except that the output member 132 pivotally support the engagement pawls 164, and that the output member 132 has a cylindrical outer peripheral surface without the projections 89 of the output member 32. The output member 132 is fixedly coupled to the front sprocket 28.

The engagement pawls 164 are pivotally arranged between a release position (see FIG. 5B) and an engagement position (see FIG. 5A). In the illustrated embodiment, the engagement pawls 164 are pivotally coupled to the output member 132 in a conventional manner. The engagement pawls 164 are circumferentially arranged relative to each other with equal circumferential spacing therebetween. The engagement pawls 164 are configured to frictionally engage with the inner peripheral surface 142a (i.e., the friction engagement portion 160) of the torque transmission part 142 as the crank axle 14 rotates about the first rotational axis X1 in the forward rotational direction (e.g., the first rotational direction). The engagement pawls 164 are configured to be at least frictionally disengaged from the inner peripheral surface 142a of the torque transmission part 142 as the crank axle 14 rotates about the first rotational axis X1 in the rearward rotational direction (e.g., the second rotational direction). In the illustrated embodiment, the phrase "the engagement pawls 164 are configured to be at least frictionally disengaged from the inner peripheral surface 142a of the torque transmission part 142" does not necessarily require that the engagement pawls 164 are spaced apart from the friction engagement portion 160. Rather, it can mean that the engagement pawls 164 slides along the inner peripheral surface 142a of the torque transmission part 142 while contacting with the inner peripheral surface 142a. In this case, the engagement pawls 164 are disengaged from the inner peripheral surface 142a (i.e., the friction engagement portion 160) for preventing the rotation of the crank axle 14 from being transmitted to the output shaft 30c of the motor 30 as the crank axle 14 rotates about the first rotational axis X1 in the rearward rotational direction (e.g., the second rotational direction). Furthermore, in the illustrated embodiment, the friction engagement portion 160 and the engagement pawls 164 are used for obtaining frictional engagement in the one-way clutch 138. However, of course, other types of frictional engagement members can be used in the one-way clutch 138 instead of the engagement pawls 164.

The biasing members 166 bias the engagement pawls 164 towards the release position, as shown in FIG. 5B. The biasing members 166 are attached to the engagement pawls 164 in a conventional manner, respectively.

The control parts 168 are configured to move the engagement pawls 164 towards the engagement position, respectively, as the crank axle 14 rotates about the first rotational axis X1 in the forward rotational direction (e.g., the first rotational direction). The contact parts 170 are configured to transmit the rotation of the crank axle 14 to the output member 132 as the crank axle 14 rotates about the first rotational axis X1 in the rearward rotational direction (e.g., the second rotational direction).

Specifically, as shown in FIGS. 5A and 5B, the control parts 168 radially protrude on an outer peripheral surface 116a of the first rotation transmitting member 116 at locations circumferentially spaced apart from each other. The contact parts 170 also radially protrude on the outer peripheral surface 116a of the first rotation transmitting member 116 at locations circumferentially between the control parts 168, respectively. As shown in FIG. 5A, the control parts 168 push the engagement pawls 164 on inner surfaces 164a of the engagement pawls 164 towards the engagement position, respectively, as the crank axle 14 rotates in the forward rotational direction. This engages outer surfaces 164b of the engagement pawls 164 with the friction engagement portion 160. Thus, the rotation of the motor 30 is transmitted to the front sprocket 28 via the torque transmission part 142, the one-way clutch 138 and the output member 132 as the crank axle 14 rotates in the forward rotational direction. On the other hand, as shown in FIG. 5B, the control parts 168 relatively rotates away from the inner surfaces 164a of the engagement pawls 164 as the crank axle 14 rotates the rearward rotational direction. Then, the biasing members 166 move the engagement pawls 164 towards the release position. This disengages the outer surfaces 164b of the engagement pawls 164 from the friction engagement portion 160. Furthermore, the contact parts 170 contacts with support ends 164c of the engagement pawls 164 as the crank axle 14 rotates in the rearward rotational direction. This rotates the output member 132 in the rearward rotational direction. Thus, the rearward rotation of the crank axle 14 is transmitted to the front sprocket 28 via the first rotation transmitting member 116 and the output member 132.

Second Embodiment

Figure 6:
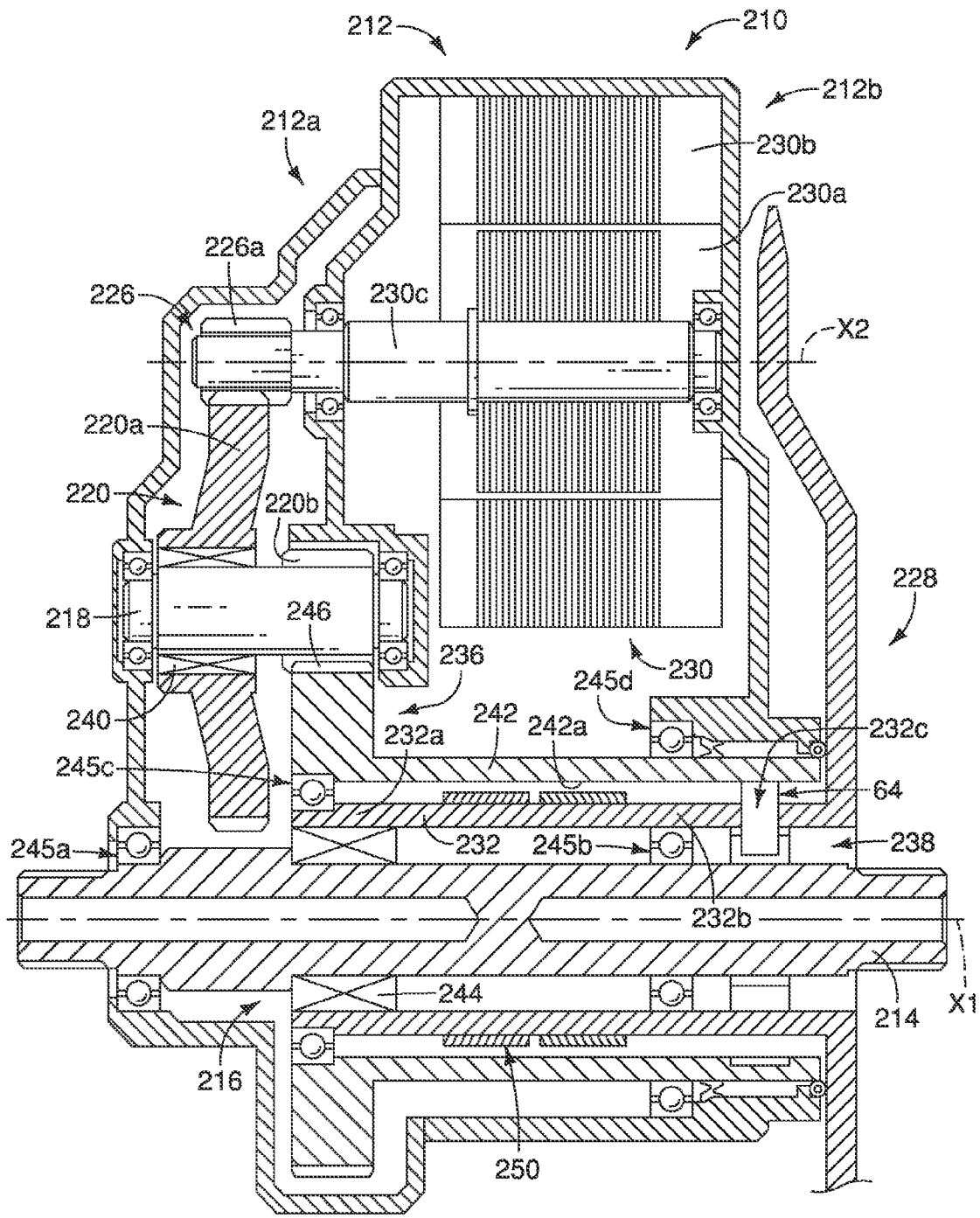
FIG. 6 is a cross-sectional view of a drive unit in accordance with a second embodiment.

Referring now to FIG. 6, a drive unit 210 in accordance with a second embodiment will now be explained.

In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "200" added thereto. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

Basically, the drive unit 210 is arranged in a vicinity of the crank arms 101 (see FIG. 1). In the illustrated embodiment, as shown in FIG. 6, the drive unit 210 has a housing 212, a crank axle 214, a first rotation transmitting member 216, an intermediate axle 218, a second rotation transmitting member 220, a third rotation transmitting member 226 and a front sprocket 228 (e.g., a front sprocket wheel). As shown in FIG. 6, the drive unit 210 has a motor 230, an output member 232, and a torque combining mechanism 236 with a one-way clutch 238. Thus, the bicycle drive unit 210 includes the crank axle 214, the motor 230, the output member 232, and the torque combining mechanism 236.

In the illustrated embodiment, the intermediate axle 218, the second rotation transmitting member 220, the third rotation transmitting member 226, and the motor 230 are identical to the intermediate axle 18, the second rotation transmitting member 20, the third rotation transmitting member 26, and the motor 30 in accordance with the first embodiment. Thus, the detailed configurations will be omitted for the sake of brevity. Furthermore, the housing 212 is also identical to the housing 12 in accordance with the first embodiment, except for minor modification for accommodating the first rotation transmitting member 216, the intermediate axle 218, the second rotation transmitting member 220, the third rotation transmitting member 226, the motor 230, and the torque combining mechanism 236 in accordance with the second embodiment. Thus, the detailed configurations will be omitted for the sake of brevity.

The housing 212 mainly accommodates the first rotation transmitting member 216, the intermediate axle 218, the second rotation transmitting member 220, the third rotation transmitting member 226, the motor 230, and the torque combining mechanism 236. The housing 212 also rotatably supports the crank axle 214. The crank axle 214 axially extends through the housing 212.

The crank axle 214 is basically identical to the crank axle 14 in accordance with the first embodiment. The crank axle 214 is rotatable about a first rotational axis X1. The crank axle 214 is rotatably supported with respect to the housing 212 by first, second, third and fourth bearings 245a, 245b, 245c and 245d, such as ball bearings. The first bearing 245a is radially disposed between a first side part 212a of the housing 212 and the crank axle 214 in the opening of the first side part 212a. The second bearing 245b is radially disposed between the output member 232 and the crank axle 214. The third bearing 245c is radially disposed between the output member 232 and a torque transmission part 242 of the torque combining mechanism 236. The fourth bearing 245d is radially disposed between the torque transmission part 242 of the torque combining mechanism 236 and a second side part 212b of the housing 212. The two ends of the crank axle 214 are arranged to protrude out from the first side part 212a and the second side part 212b, respectively.

The first rotation transmitting member 216 has a one-way clutch 244 that is radially disposed between the crank axle 214 and the output member 232. The one-way clutch 244 only transmits the rotation of the crank axle 214 in the forward rotational direction to the output member 232 therethrough. In the illustrated embodiment, the one-way clutch 244 is configured to be a roller clutch. The intermediate axle 218 is rotatably supported inside the housing 212 by a pair of bearings. The second rotation transmitting member 220 has a large gear 220a and a small gear 220b. The large gear 220a is rotatably supported on the intermediate axle 218 via a one-way clutch 240. The one-way clutch 240 only transmits the rotation of the motor 230 in a direction for assisting the pedaling force in the forward rotational direction. The third rotation transmitting member 226 has an externally toothed gear 226a.

In the illustrated embodiment, the front sprocket 228 and the output member 232 are integrally formed as a one-piece, unitary member. Thus, the front sprocket 228 and the output member 232 rotate together. The output member 232 is basically a cylindrical part that axially extends along the first rotational axis X1. The front sprocket 228 rotates about the first rotational axis X1 of the crank axle 214. Thus, the rotational axis of the crank axle 214 and the rotational axis of the front sprocket 228 are coincident with each other. In the illustrated embodiment, the front sprocket 228 and the output member 232 are integrally formed as a one-piece, unitary member. However, of course, the front sprocket 228 and the output member 232 can be independently formed as separate parts. In this case, the output member 232 is configured to be attached to the front sprocket 228 (e.g., the front sprocket wheel). For example, the front sprocket 228 can include a conventional spider with a sleeve, and a conventional ring chain wheel attached to the spider in a conventional manner. Then, the output part 232 can be fixedly coupled to the sleeve of the spider of the front sprocket 228.

The output member 232 is rotatably supported to the crank axle 214. Specifically, the output member 232 is rotatable relative to the crank axle 214. The output member 232 is rotatable about the first rotational axis X1 in the forward rotational direction (e.g., the first rotational direction) as the crank axle 214 rotates about the first rotational axis X1 in the forward rotational direction (e.g., the first rotational direction). On the other hand, the output member 232 is rotatable about the first rotational axis X1 in the rearward rotational direction (e.g., the second rotational direction) as the crank axle 214 rotates about the first rotational axis X1 in the rearward rotational direction (e.g., the second rotational direction). The rearward rotational direction (e.g., the second rotational direction) is opposite the forward rotational direction (e.g., the first rotational direction). The output member 232 is rotatably supported to the crank axle 214 via the one-way clutch 244 and the second bearing 245b. Specifically, the output member 232 has first and second end portions 232a and 232b. The first end portion 232a is supported to the crank axle 214 via the one-way clutch 244, while the second end portion 232b is supported to the crank axle 214 via the second bearing 245b. The output member 232 also has a torque sensor 250 with a pair of magnetic deflection elements and a pair of coils (only the magnetic deflection elements are illustrated in FIG. 6). The magnetic deflection elements and the coils radially face with each other, respectively, in a conventional manner. The torque detected by the torque sensor 250 is used to control the rotational output of the motor 230. Of course, it will be apparent to those skilled in the art from this disclosure that the torque sensor 250 can be other type of torque sensors.

In the illustrated embodiment, the motor 230 is an inner rotor-type motor. The motor 230 has a rotor 230a and a stator 230b. Since the motor 230 has a conventional configuration, the detailed description will be omitted for the sake of brevity. The stator 230b is fixedly coupled to an inner side surface of the housing 212. The rotor 230a is fixedly coupled to an output shaft 230c of the motor 230. The output shaft 230c is rotatably supported relative to the housing 212 by a pair of bearings. Specifically, the output shaft 230c is rotatable about a second rotational axis X2. In the illustrated embodiment, the second rotational axis X2 is arranged to extend parallel to the first rotational axis X1 at spaced locations.

In the illustrated embodiment, the gear 226a of the third rotation transmitting member 226 is fixedly coupled to a distal end of the output shaft 230c of the motor 230. The gear 226a also meshes with the large gear 220a of the second rotation transmitting member 220. The large gear 220a is rotatably coupled to the intermediate axle 218 via the one-way clutch 240. The one-way clutch 240 only transmits rotational output of the motor 230 for the forward rotation of the front sprocket 228 to the intermediate axle 218. The small gear 220b is fixedly coupled to the intermediate axle 218.

The torque combining mechanism 236 is operatively disposed between the motor 230 and the output member 232. The torque combining mechanism 236 operatively couples the output shaft 230c of the motor 230 to the output member 232 to transmit rotation of the output shaft 230c of the motor 230 to the output member 232. The torque combining mechanism 236 is configured to operatively separate the output shaft 230c of the motor 230 from the output member 232 for preventing rotation of the crank axle 214 from being transmitted to the output shaft 230c of the motor 230 as the crank axle 214 rotates about the first rotational axis X1 in the rearward rotational direction (e.g., the second rotational direction).

Specifically, the torque combining mechanism 236 has the one-way clutch 238. The torque combining mechanism 236 also has a torque transmission part 242. The torque transmission part 242 is rotatable about the first rotational axis X1. The torque transmission part 242 is operatively coupled to the output shaft 230c of the motor 230. More specifically, the torque transmission part 242 is rotatably supported on an outer peripheral surface of the first end portion 232a of the output member 232 via the third bearing 245c. Furthermore, the torque transmission part 242 is rotatably supported to the housing 212 via the fourth bearing 245d. The torque transmission part 242 has an outer gear 246 on an outer peripheral surface of a large diameter portion of the torque transmission part 242. The outer gear 246 meshes with the small gear 220b of the second rotation transmitting member 220. Thus, the torque transmission part 242 transmits the rotation of the motor 230. The torque transmission part 242 is rotatably coupled to the output member 232 via the one-way clutch 238.

The one-way clutch 238 is disposed between an inner peripheral surface 242a of the torque transmission part 242 and the second end portion 232b of the output member 232. In other words, the one-way clutch 238 is operatively disposed between the output shaft 230c of the motor 230 and the output member 232. The one-way clutch 238 only transmits the rotation of the motor 230 to the output member 232 while the crank axle 214 rotates in the forward rotational direction. The torque combining mechanism 236 combines the rotational output of the motor 230 transmitted to the outer gear 246 of the torque transmission part 242 and the rotational output of the crank axle 214 transmitted from the first rotation transmitting member 216 via the one-way clutch 244. Specifically, the one-way clutch 238 operatively couples the output shaft 230c of the motor 230 to the output member 232 as the crank axle 214 rotates about the first rotational axis X1 in the forward rotational direction (e.g., the first rotational direction). On the other hand, the one-way clutch 238 operatively separates the output shaft 230c of the motor 230 from the output member 232 for preventing the rotation of the crank axle 214 from being transmitted to the output shaft 230c of the motor 230 as the crank axle 214 rotates about the first rotational axis X1 in the rearward rotational direction (e.g., the second rotational direction).

Figure 7A:
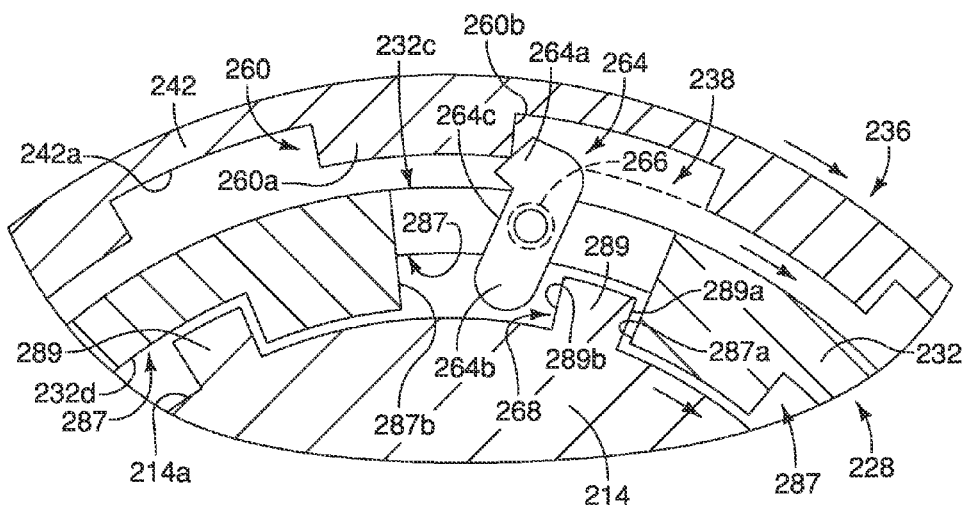
FIG. 7A is an enlarged, partial cross-sectional view of a clutch mechanism of the drive unit illustrated in FIG. 6, illustrating an engagement pawl moved towards an engagement position of the engagement pawl.
Figure 7B:
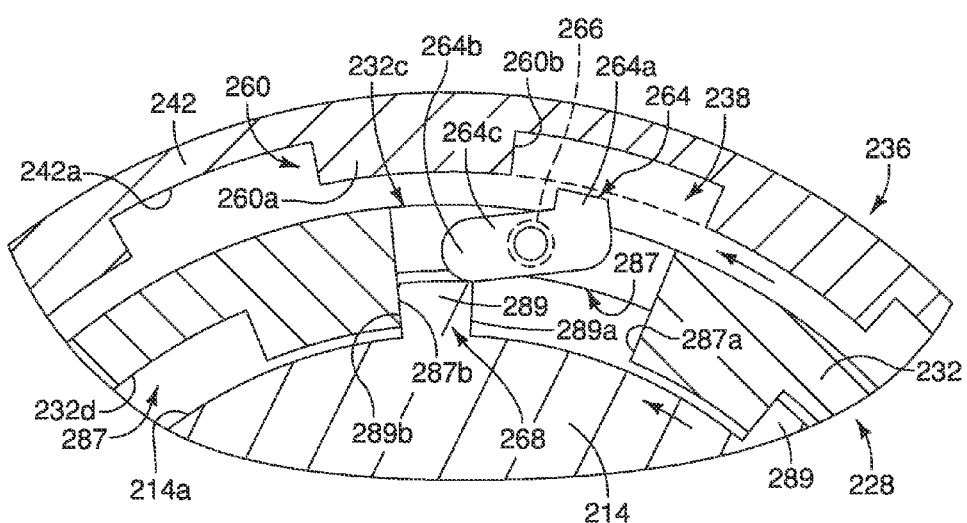
FIG. 7B is an enlarged, partial cross-sectional view of the clutch mechanism of the drive unit illustrated in FIG. 6, illustrating the engagement pawl moved towards a release position of the engagement pawl.

Referring now to FIGS. 7A and 7B, the configuration of the one-way clutch 238 will be further described in detail. The one-way clutch 238 includes an internally toothed portion 260, an engagement pawl 264, and a biasing member 266. The one-way clutch 238 also includes a control part 268.

The toothed portion 260 is disposed on the inner peripheral surface 242a of the torque transmission part 242. The toothed portion 260 has a plurality of engagement teeth 260a formed on the inner peripheral surface 242a of the torque transmission part 242. The engagement teeth 260a have engagement faces 260b that selectively engage with the engagement pawl 264 for transmitting the rotation of the motor 230 to the output member 232.

The engagement pawl 264 is pivotally mounted to the second end portion 232b of the output member 232. The engagement pawl 264 is pivotally arranged between a release position (see FIG. 7B) and an engagement position (see FIG. 7A). The engagement pawl 264 is configured to engage with the toothed portion 260 as the crank axle 214 rotates about the first rotational axis X1 in the forward rotational direction (e.g., the first rotational direction or a clockwise direction in FIG. 7A). The engagement pawl 264 is configured to be disengaged from the toothed portion 260 as the crank axle 214 rotates about the first rotational axis X1 in the rearward rotational direction (e.g., the second rotational direction or a counter-clockwise direction in FIG. 7B). In the illustrated embodiment, the "disengagement" of the engagement pawl 264 from the toothed portion 260 does not necessarily require that the engagement pawl 264 is spaced apart from the toothed portion 260. Rather, it can mean that the engagement pawl 264 slides over the toothed portion 260 while contacting with the toothed portion 260. In this case, the engagement pawl 264 is disengaged from the toothed portion 260 for preventing the rotation of the crank axle 214 from being transmitted to the output shaft 230c of the motor 230 as the crank axle 214 rotates about the first rotational axis X1 in the rearward rotational direction (e.g., the second rotational direction).

The engagement pawl 264 has an engagement end 264a, a control end 264b, and a support part 264c disposed between the engagement end 264a and the control end 264b. The engagement end 264a is engaged with the engagement teeth 260a of the toothed portion 260 while the engagement pawl 264 is located at the engagement position. The engagement end 264a is disengaged from the engagement teeth 260a of the toothed portion 260 while the engagement pawl 264 is located at the release position. The engagement pawl 264 is pivotally mounted to the second end portion 232b of the output part 232 in a conventional manner. Specifically, the engagement pawl 264 is pivotally disposed within a pawl receiving opening 232c of the second end portion 232b of the output part 232. As shown in FIGS. 7A and 7B, the pawl receiving opening 232c radially extends through the second end portion 232b. In the illustrated embodiment, the support part 264c of the engagement pawl 264 is pivotally coupled to a pivot pin that is disposed within the pawl receiving opening 232c of the output part 232. The engagement pawl 264 is arranged relative to the second end portion 232b such that the engagement end 264a radially outwardly protrudes relative to the second end portion 232b and the control end 264b radially inwardly protrudes relative to the second end portion 232b. The control end 264b is operated by the control part 268 such that the engagement pawl 264 pivots between the release position and the engagement position. In the illustrated embodiment, the one-way clutch 238 includes single engagement pawl 264. However, it will be apparent to those skilled in the art from this disclosure that the one-way clutch 238 includes a plurality of engagement pawls.

The biasing member 266 biases the engagement pawl 264 towards the engagement position. The biasing member 266 basically includes a pawl spring operatively disposed between the engagement pawl 264 and the output member 232. In the illustrated embodiment, the one-way clutch 238 includes single biasing member 266. However, it will be apparent to those skilled in the art from this disclosure that the one-way clutch 238 includes a plurality of biasing members corresponding to a plurality of engagement pawls.

The control part 268 is disposed on an outer peripheral surface of the crank axle 214. The control part 268 is configured to move the engagement pawl 264 towards the release position as the crank axle 214 rotates about the first rotational axis X1 in the rearward rotational direction (e.g., the second rotational direction). Specifically, as shown in FIGS. 7A and 7B, the output part 232 has a plurality of recesses 287 (e.g., recess parts) on an inner peripheral surface 232d of the second end portion 232b. The recesses 287 are circumferentially arranged on the inner peripheral surface 232d of the second end portion 232b. On the other hand, the crank axle 214 has a plurality of projections 289 on an outer peripheral surface 214a of the crank axle 214. The projections 289 are circumferentially arranged on the outer peripheral surface 214a of the crank axle 214. In the illustrated embodiment, one of the projections 289 forms the control part 268. The recesses 287 and the projections 289 are arranged relative to each other with circumferential spacing therebetween, respectively, to provide the limited range of relative rotation between the crank axle 214 and the output member 232.

In the illustrated embodiment, as shown in FIGS. 7A and 7B, each of the recesses 287 has first and second inside surfaces 287a and 287b, while each of the projections 289 has first and second contact surfaces 289a and 289b.

As shown in FIG. 7A, the first contact surfaces 289a of the projections 289 circumferentially do not contact with the first inside surfaces 287a of the recesses 287, respectively, as the crank axle 214 rotates in the forward rotational direction. Rather, each of the first contact surfaces 289a of the projections 289 circumferentially face with respective one of the first inside surfaces 287a of the recesses 287 with a gap therebetween as the crank axle 214 rotates in the forward rotational direction. Furthermore, as the crank axle 214 rotates in the forward rotational direction, the one-way clutch 238 operatively couples the torque transmission part 242 to the output member 232. However, while the pedalling force detected by the torque sensor 250 is less than a prescribed threshold, the motor output torque of the motor 230 is not generated even if the crank axle 214 rotates in the forward rotational direction. In this case, the one-way clutch 244 of the first rotation transmitting member 216 operatively couples the crank axle 214 to the output member 232 such that the rotation of the crank axle 214 in the forward rotational direction is transmitted from the crank axle 214 to the output member 232 via the one-way clutch 244. Furthermore, while the pedalling force detected by the torque sensor 250 is more than the prescribed threshold, the motor output torque of the motor 230 is generated as an assisting power for assisting the pedalling force when the crank axle 214 rotates in the forward rotational direction. In this case, the one-way clutch 238 operatively couples the torque transmission part 242 to the output member 232 such that the motor output torque of the motor 230 is transmitted to the output member 232 via the torque transmission part 242 and the one-way clutch 238.

In the illustrated embodiment, the rotation of the crank axle 214 in the forward rotational direction is transmitted from the crank axle 214 to the output member 232 only via the one-way clutch 244 of the first rotation transmitting member 216.

On the other hand, as shown in FIG. 7B, the second contact surfaces 289b of the projections 289 (e.g., a contact surface of the control part) circumferentially contact with the second inside surfaces 287b of the recesses 287 (e.g., an inside surface of the recess part of the output member) to transmit the rotation of the crank axle 214 to the output member 232, respectively, as the crank axle 214 rotates about the first rotational axis X1 in the rearward rotational direction (e.g., the second rotational direction). Furthermore, as the crank axle 214 rotates in the rearward rotational direction, the one-way clutch 238 operatively separates the torque transmission part 242 from the output member 232 for preventing the rotation of the crank axle 214 from being transmitted to the output shaft 230c of the motor 230 via the torque transmission part 242. When the crank axle 214 rotates in the rearward rotational direction, the second contact surfaces 289b of the projections 289 of the crank axle 214 contact with the second inside surfaces 287b of the recesses 287 of the output member 232, respectively, such that the rotation of the crank axle 214 in the rearward rotational direction is directly transmitted from the crank axle 214 to the output member 232.

With this drive unit 210, the torque generated by the pedaling force in the forward rotational direction is transmitted in the following transmission passage: the crank arms 101→the crank axle 214→the first rotation transmitting member 216→the output member 232→the front sprocket 228. Furthermore, the output torque of the motor 230 for assisting the pedaling force in the forward rotational direction is transmitted in the following path: the third rotation transmitting member 226→the second rotation transmitting member 220→the torque transmission part 242→the one-way clutch 238→the output member 232→the front sprocket 228.

On the other hand, with this drive unit 210, the rearward rotation of the crank arms 101 is also transmitted to the front sprocket 228 to rotate the front sprocket 228 in the rearward rotational direction. Specifically, the torque generated by the pedaling force in the rearward rotational direction is also transmitted in the following transmission passage: the crank arms 101→the crank axle 214→the engagement between the recesses 287 and projections 289→the output member 232→the front sprocket 228. The rearward rotation of the crank arms 101 is not transmitted to the torque transmission part 242 of the torque combining mechanism 236 by the operation of the one-way clutch 238.

Third Embodiment

Figure 8:
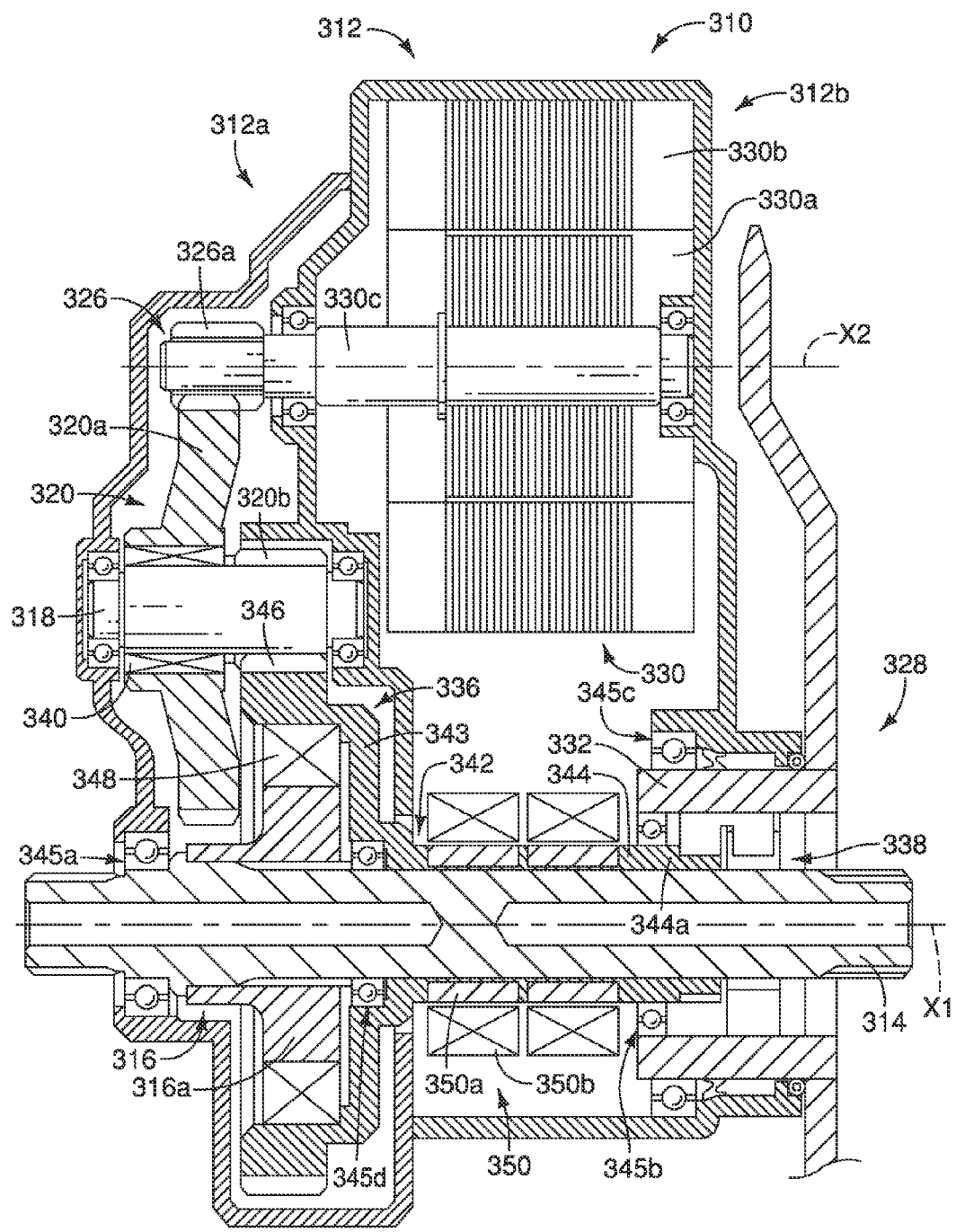
FIG. 8 is a cross-sectional view of a drive unit in accordance with a third embodiment.

Referring now to FIG. 8, a drive unit 310 in accordance with a third embodiment will now be explained.

In view of the similarity between the first and third embodiments, the parts of the third embodiment that are identical to the parts of the first embodiment will be given the same reference numerals as the parts of the first embodiment. Also, parts of this third embodiment that are functionally identical and/or substantially identical to parts of the first embodiment will be given the same reference numerals but with "300" added thereto. In any event, the descriptions of the parts of the third embodiment that are substantially identical to the parts of the first embodiment may be omitted for the sake of brevity. However, it will be apparent to those skilled in the art from this disclosure that the descriptions and illustrations of the first embodiment also apply to this third embodiment, except as discussed and/or illustrated herein.

Basically, the drive unit 310 is arranged in a vicinity of the crank arms 101 (see FIG. 1). In the illustrated embodiment, as shown in FIG. 8, the drive unit 310 has a housing 312, a crank axle 314, a first rotation transmitting member 316, an intermediate axle 318, a second rotation transmitting member 320, a third rotation transmitting member 326 and a front sprocket 328 (e.g., a front sprocket wheel). As shown in FIG. 8, the drive unit 310 has a motor 330, an output member 332, and a torque combining mechanism 336 with a one-way clutch 338. Thus, the bicycle drive unit 310 includes the crank axle 314, the motor 330, the output member 332, and the torque combining mechanism 336.

In the illustrated embodiment, the intermediate axle 318, the second rotation transmitting member 320, the third rotation transmitting member 326, and the motor 330 are identical to the intermediate axle 18, the second rotation transmitting member 20, the third rotation transmitting member 26, and the motor 30 in accordance with the first embodiment. Thus, the detailed configurations will be omitted for the sake of brevity. Furthermore, the housing 312 is also identical to the housing 12 in accordance with the first embodiment, except for minor modification for accommodating the first rotation transmitting member 316, the intermediate axle 318, the second rotation transmitting member 320, the third rotation transmitting member 326, the motor 330, and the torque combining mechanism 336 in accordance with the third embodiment. Thus, the detailed configurations will be omitted for the sake of brevity.

The housing 312 mainly accommodates the first rotation transmitting member 316, the intermediate axle 318, the second rotation transmitting member 320, the third rotation transmitting member 326, the motor 330, and the torque combining mechanism 336. The housing 312 also rotatably supports the crank axle 314. The crank axle 314 axially extends through the housing 312.

The crank axle 314 is basically identical to the crank axle 14 in accordance with the first embodiment. The crank axle 314 is rotatable about a first rotational axis X1. The crank axle 314 is rotatably supported with respect to the housing 312 by first, second and third bearings 345a, 345b and 345c, such as ball bearings. The first bearing 345a is radially disposed between a first side part 312a of the housing 312 and the crank axle 314 in the opening of the first side part 312a. The second bearing 345b is radially disposed between the output member 332 and the crank axle 314. The third bearing 345c is radially disposed between the output member 332 and a second side part 312b of the housing 312. The two ends of the crank axle 314 are arranged to protrude out from the first side part 312a and the second side part 312b, respectively. The first rotation transmitting member 316 has an enlarged gear portion 316a that is fixedly coupled to the crank axle 314. The intermediate axle 318 is rotatably supported inside the housing 312 by a pair of bearings. The second rotation transmitting member 320 has a large gear 320a and a small gear 320b. The large gear 320a is rotatably supported on the intermediate axle 318 via a one-way clutch 340. The one-way clutch 340 only transmits the rotation of the motor 330 in a direction for assisting the pedaling force in the forward rotational direction. The third rotation transmitting member 326 has an externally toothed gear 326a.

In the illustrated embodiment, the front sprocket 328 and the output member 332 are fixedly coupled to each other. In other words, the output member 332 is configured to be attached to the front sprocket 328 (e.g., the front sprocket wheel). Thus, the front sprocket 328 and the output member 332 rotate together. The output member 332 is basically a cylindrical part that axially extends along the first rotational axis X1. The front sprocket 328 rotates about the first rotational axis X1 of the crank axle 314. Thus, the rotational axis of the crank axle 314 and the rotational axis of the front sprocket 328 are coincident with each other. In the illustrated embodiment, the front sprocket 328 and the output member 332 are independently formed as separate parts. However, of course, the front sprocket 328 and the output member 332 can be integrally formed as a one-piece unitary member.

The output member 332 is rotatably supported to the crank axle 314. Specifically, the output member 332 is rotatable relative to the crank axle 314. The output member 332 is rotatable about the first rotational axis X1 in the forward rotational direction (e.g., the first rotational direction) as the crank axle 314 rotates about the first rotational axis X1 in the forward rotational direction (e.g., the first rotational direction). On the other hand, the output member 332 is rotatable about the first rotational axis X1 in the rearward rotational direction (e.g., the second rotational direction) as the crank axle 314 rotates about the first rotational axis X1 in the rearward rotational direction (e.g., the second rotational direction). The rearward rotational direction (e.g., the second rotational direction) is opposite the forward rotational direction (e.g., the first rotational direction). The output member 332 is rotatably supported to the crank axle 314 via the second bearing 345b.

In the illustrated embodiment, the motor 330 is an inner rotor-type motor. The motor 330 has a rotor 330a and a stator 330b. Since the motor 330 has a conventional configuration, the detailed description will be omitted for the sake of brevity. The stator 330b is fixedly coupled to an inner side surface of the housing 312. The rotor 330a is fixedly coupled to an output shaft 330c of the motor 330. The output shaft 330c is rotatably supported relative to the housing 312 by a pair of bearings. Specifically, the output shaft 330c is rotatable about a second rotational axis X2. In the illustrated embodiment, the second rotational axis X2 is arranged to extend parallel to the first rotational axis X1 at spaced locations.

In the illustrated embodiment, the gear 326a of the third rotation transmitting member 326 is fixedly coupled to a distal end of the output shaft 330c of the motor 330. The gear 326a also meshes with the large gear 320a of the second rotation transmitting member 320. The large gear 320a is rotatably coupled to the intermediate axle 318 via the one-way clutch 340. The one-way clutch 340 only transmits rotational output of the motor 330 for the forward rotation of the front sprocket 328 to the intermediate axle 318. The small gear 320b is fixedly coupled to the intermediate axle 318.

The torque combining mechanism 336 operatively couples the motor 330 and the crank axle 314 to combine rotational outputs of the motor 330 and the crank axle 314. The torque combining mechanism 336 is operatively disposed between the motor 330 and the output member 332. The torque combining mechanism 336 operatively couples the output shaft 330c of the motor 330 to the output member 332 to transmit rotation of the output shaft 330c of the motor 330 to the output member 332. The torque combining mechanism 336 is configured to operatively separate the output shaft 330c of the motor 330 from the output member 332 for preventing rotation of the crank axle 314 from being transmitted to the output shaft 330c of the motor 330 as the crank axle 314 rotates about the first rotational axis X1 in the rearward rotational direction (e.g., the second rotational direction).

Specifically, the torque combining mechanism 336 has the one-way clutch 338. The torque combining mechanism 336 also has the torque transmission part 342. The torque transmission part 342 is rotatable about the first rotational axis X1. The torque transmission part 342 is operatively coupled to the output shaft 330c of the motor 330. More specifically, the torque transmission part 342 is rotatably supported to the crank axle 314 via a fourth bearing 345d. The torque transmission part 342 has a casing portion 343 and an axially extending sleeve 344. The casing portion 343 has an outer gear 346 on an outer peripheral surface of the casing portion 343. The outer gear 346 meshes with the small gear 320b of the second rotation transmitting member 320. The casing portion 343 is rotatably coupled to the first rotation transmitting member 316 via a one-way clutch 348. In particular, the one-way clutch 348 is disposed between an inner peripheral surface of the casing portion 343 and the enlarged gear portion 316a of the first rotation transmitting member 316. The one-way clutch 348 only transmits the forward rotation of the crank axle 314 to the casing portion. 343 of the torque transmission part 342. Thus, the torque combining mechanism 336 combines the rotational output of the motor 330 transmitted to the outer gear 346 of the casing portion 343 and the rotational output of the crank axle 314 transmitted from the enlarged gear portion 316a via the one-way clutch 348. The axially extending sleeve 344 of the torque transmission part 342 is rotatably coupled to the output member 332 via the one-way clutch 338 at an end portion 344a of the axially extending sleeve 344. The axially extending sleeve 344 of the torque transmission part 342 has a torque sensor 350 with a pair of magnetic deflection elements 350a and a pair of coils 350b that radially face with each other, respectively. The torque detected by the torque sensor 350 is used to control the rotational output of the motor 330. Of course, it will be apparent to those skilled in the art from this disclosure that die torque sensor 350 can be other type of torque sensors.

The one-way clutch 338 is disposed between to an outer peripheral surface 344b of the axially extending sleeve 344 and the output member 332 at the end portion 344a of the axially extending sleeve 344. In other words, the one-way clutch 338 is operatively disposed between the output shaft 330c of the motor 330 and the output member 332. The one-way clutch 338 only transmits the rotation of the motor 330 to the output member 332 while the crank axle 314 rotates in the forward rotational direction. The torque combining mechanism 336 combines the rotational output of the motor 330 transmitted to the outer gear 346 of the torque transmission part 342 and the rotational output of the crank axle 314 transmitted from the first rotation transmitting member 316 via the one-way clutch 338. Specifically, the one-way clutch 338 operatively couples the output shaft 330c of the motor 330 to the output member 332 as the crank axle 314 rotates about the first rotational axis X1 in the forward rotational direction (e.g., the first rotational direction). On the other hand, the one-way clutch 338 operatively separates the output shaft 330c of the motor 330 from the output member 332 for preventing the rotation of the crank axle 314 from being transmitted to the output shaft 330c of the motor 330 as the crank axle 314 rotates about the first rotational axis X1 in the rearward rotational direction (e.g., the second rotational direction).

Figure 9A:
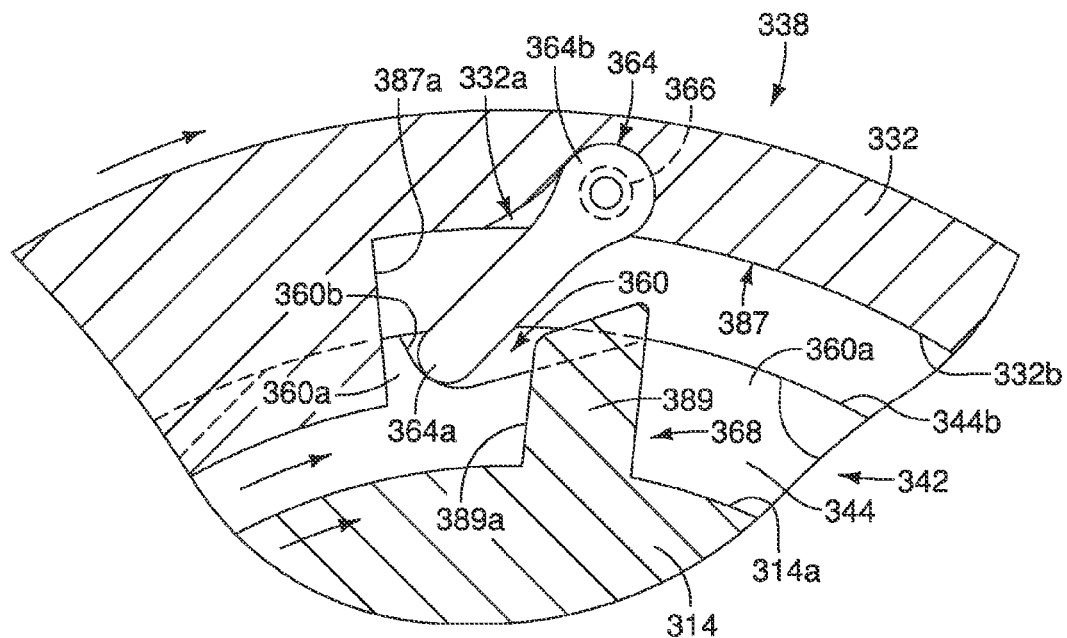
FIG. 9A is an enlarged, partial cross-sectional view of a clutch mechanism of the drive unit illustrated in FIG. 8, illustrating an engagement pawl moved towards an engagement position of the engagement pawl.
Figure 9B:
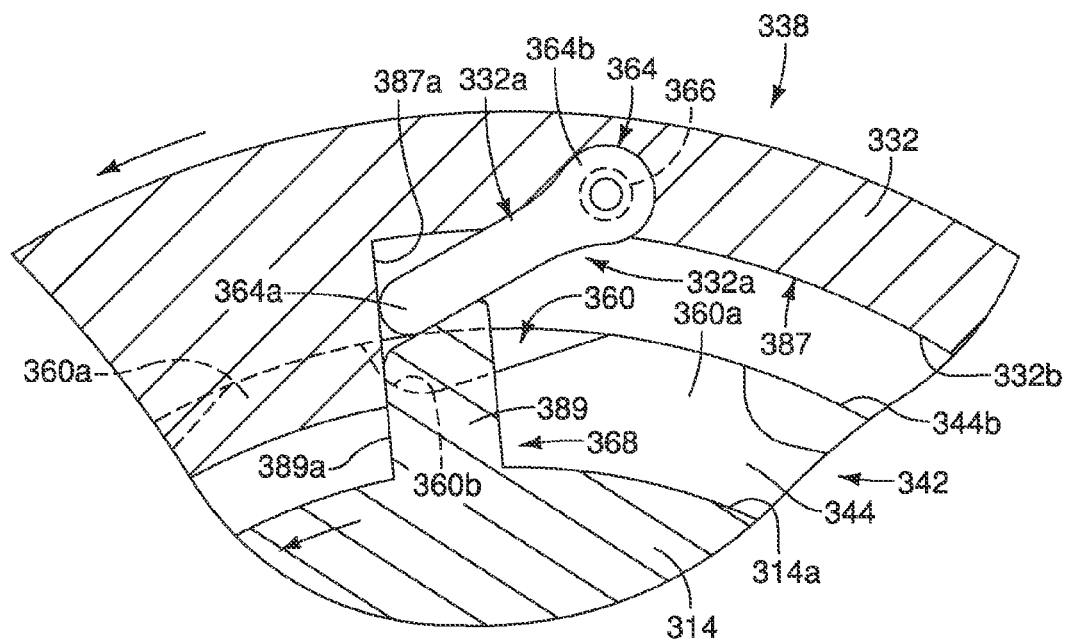
FIG. 9B is an enlarged, partial cross-sectional view of the clutch mechanism of the drive unit illustrated in FIG. 8, illustrating the engagement pawl moved towards a release position of the engagement pawl.

Referring now to FIGS. 9A and 9B, the configuration of the one-way clutch 338 will be further described in detail. The one-way clutch 338 includes an externally toothed portion 360, an engagement pawl 364, and a biasing member 366. The one-way clutch 338 also includes a control part 368.

The toothed portion 360 is disposed on the outer peripheral surface 344b of the axially extending sleeve 344 of the torque transmission part 342. The toothed portion 360 has a plurality of engagement teeth 360a formed on the outer peripheral surface 344b of the axially extending sleeve 344. The engagement teeth 360a have engagement faces 360b that selectively engage with the engagement pawl 364 for transmitting the rotation of the motor 330 to the output member 332.

The engagement pawl 364 is pivotally mounted to the output member 332. The engagement pawl 364 is pivotally arranged between a release position (see FIG. 9B) and an engagement position (see FIG. 9A). The engagement pawl 364 is configured to engage with the toothed portion 360 as the crank axle 314 rotates about the first rotational axis X1 in the forward rotational direction (e.g., the first rotational direction or a clockwise direction in FIG. 9A). The engagement pawl 364 is configured to be disengaged from the toothed portion 360 as the crank axle 314 rotates about the first rotational axis X1 in the rearward rotational direction (e.g., the second rotational direction or a counter-clockwise direction in FIG. 9B). In the illustrated embodiment, the "disengagement" of the engagement pawl 364 from the toothed portion 360 does not necessarily require that the engagement pawl 364 is spaced apart from the toothed portion 360. Rather, it can mean that the engagement pawl 364 slides over the toothed portion 360 while contacting with the toothed portion 360. In this case, the engagement pawl 364 is disengaged from the toothed portion 360 for preventing the rotation of the crank axle 314 from being transmitted to the output shaft 330c of the motor 330 as the crank axle 314 rotates about the first rotational axis X1 in the rearward rotational direction (e.g., the second rotational direction).

The engagement pawl 364 has an engagement end 364a and a support part 364b. The engagement end 364a is engaged with the engagement teeth 360a of the toothed portion 360 while the engagement pawl 364 is located at the engagement position. The engagement end 364a is disengaged from the engagement teeth 360a of the toothed portion 360 while the engagement pawl 364 is located at the release position. The engagement pawl 364 is pivotally mounted to the output member 332 in a conventional manner. Specifically, the engagement pawl 364 is pivotally disposed within a pawl receiving space 332a of the output member 332. In the illustrated embodiment, the support part 364b of the engagement pawl 364 is pivotally coupled to a pivot pin that is disposed within the pawl receiving space 332a of the output member 332. The engagement pawl 364 is arranged relative to the output member 332 such that the engagement end 364a radially inwardly protrudes relative to the output member. The engagement end 364a is operated by the control part 368 such that the engagement pawl 364 pivots between the release position and the engagement position. In the illustrated embodiment, the one-way clutch 338 includes single engagement pawl 364. However, it will be apparent to those skilled in the art from this disclosure that the one-way clutch 338 includes a plurality of engagement pawls.

The biasing member 366 biases the engagement pawl 364 towards the engagement position. The biasing member 366 basically includes a pawl spring operatively disposed between the engagement pawl 364 and the output member 332. In the illustrated embodiment, the one-way clutch 338 includes single biasing member 366. However, it will be apparent to those skilled in the art from this disclosure that the one-way clutch 338 includes a plurality of biasing members corresponding to a plurality of engagement pawls.

The control part 368 is disposed on an outer peripheral surface 314a of the crank axle 314. The control part 368 is configured to move the engagement pawl 364 towards the release position as the crank axle 314 rotates about the first rotational axis X1 in the rearward rotational direction (e.g., the second rotational direction). Specifically, as shown in FIGS. 9A and 9B, the output member 332 has a plurality of recesses 387 (e.g., recess parts) (only one recess 387 is shown in FIGS. 9A and 9B) on an inner peripheral surface 332b of the output member 332. The recesses 387 are circumferentially arranged on the inner peripheral surface 332b of the output member 332. On the other hand, the crank axle 314 has a plurality of projections 389 (only one projection 389 is shown in FIGS. 9A and 9B) on an outer peripheral surface 314a of the crank axle 314. The projections 389 are circumferentially arranged on the outer peripheral surface 314a of the crank axle 314. In the illustrated embodiment, one of the projections 389 forms the control part 368. The recesses 387 and the projections 389 are arranged relative to each other with circumferential spacing therebetween, respectively, to provide the limited range of relative rotation between the crank axle 314 and the output member 332. In the illustrated embodiment, the output member 332 has the plurality of the recesses 387, while the crank axle 314 has the plurality of the projections 389. However, of course, the output member 332 can only have one recess 387, while the crank axle 314 can only have one projection 389.

In the illustrated embodiment, as shown in FIGS. 9A and 9B, each of the recesses 387 has a first inside surface 387a, while each of the projections 389 has a first contact surface 389a.

As shown in FIG. 9A, the first contact surfaces 389a of the projections 389 are circumferentially spaced apart from the first inside surfaces 387a of the recesses 387, respectively, as the crank axle 314 rotates in the forward rotational direction. Furthermore, as the crank axle 314 rotates in the forward rotational direction, the one-way clutch 338 operatively couples the end portion 344a of the axially extending sleeve 344 of the torque transmission part 342 to the output member 332. However, while the pedalling force detected by the torque sensor 350 is less than a prescribed threshold, the motor output torque of the motor 330 is not generated even if the crank axle 314 rotates in the forward rotational direction. In this case, the rotation of the crank axle 314 in the forward rotational direction is transmitted from the crank axle 314 to the output member 332 via the first rotation transmitting member 316, the one-way clutch 348, the torque transmission part 342, and the one-way clutch 338. Furthermore, while the pedalling force detected by the torque sensor 350 is more than the prescribed threshold, the motor output torque of the motor 330 is generated as an assisting power for assisting the pedalling force when the crank axle 314 rotates in the forward rotational direction. In this case, the motor output torque of the motor 330 is transmitted to the output member 332 via the torque transmission part 342 and the one-way clutch 338.

On the other hand, as shown in FIG. 9B, the first contact surfaces 389a of the projections 389 (e.g., a contact surface of the control part) circumferentially contact with the first inside surfaces 387a of the recesses 387 (e.g., an inside surface of the recess part of the output member) to transmit the rotation of the crank axle 314 to the output member 332, respectively, as the crank axle 314 rotates about the first rotational axis X1 in the rearward rotational direction (e.g., the second rotational direction). Furthermore, as the crank axle 314 rotates in the rearward rotational direction, the one-way clutch 338 operatively separates the torque transmission part 342 from the output member 332 for preventing the rotation of the crank axle 314 from being transmitted to the output shaft 330c of the motor 330 via the torque transmission part 342. When the crank axle 314 rotates in the rearward rotational direction, the first contact surfaces 389a of the projections 389 of the crank axle 314 contact with the first inside surfaces 387a of the recesses 387 of the output member 332, respectively, such that the rotation of the crank axle 314 in the rearward rotational direction is directly transmitted from the crank axle 314 to the output member 332.

With this drive unit 310, the torque generated by the pedaling force in the forward rotational direction is transmitted in the following transmission passage: the crank arms 101→the crank axle 314→the first rotation transmitting member 316→the one-way clutch 348→the torque transmission part 342→the one-way clutch 338→the output member 332→the front sprocket 328. Furthermore, the output torque of the motor 330 for assisting the pedaling force in the forward rotational direction is transmitted in the following path: the third rotation transmitting member 326→the second rotation transmitting member 320→the torque transmission part 342→the one-way clutch 338→the output member 332→the front sprocket 328.

On the other hand, with this drive unit 310, the rearward rotation of the crank arms 101 is also transmitted to the front sprocket 328 to rotate the front sprocket 328 in the rearward rotational direction. Specifically, the torque generated by the pedaling force in the rearward rotational direction is also transmitted in the following transmission passage: the crank arms 101→the crank axle 314→the engagement between the recesses 387 and projections 389→the output member 332→the front sprocket 328. The rearward rotation of the crank arms 101 is not transmitted to the torque transmission part 342 of the torque combining mechanism 336 by the operation of the one-way clutch 338.

In the above-mentioned embodiments, the drive unit can have a rotation detecting sensor for detecting the rotational direction of the crank axle. A motor controller can control the motor based on a signal of the sensor. When the controller receives a detecting signal from the sensor and determines that the crank axle rotates in the rearward rotational direction, then the controller controls the motor to stop the motor. The rotation detecting sensor is configured to be a magnet sensor or rotary encoder.

In understanding the scope of the present invention, the term "coupled" or "coupling", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "attached", "mounted", "bonded", "fixed" and their derivatives.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Also, the terms "part," "section," "portion," "member" or "element" when used in the singular can have the dual meaning of a single part or a plurality of parts. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially affect their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive unit comprising:
   a crank axle rotatable about a first rotational axis;
   a motor having an output shaft rotatable about a second rotational axis;
   an output member rotatable about the first rotational axis in a first rotational direction as the crank axle rotates about the first rotational axis in the first rotational direction, and rotatable about the first rotational axis in a second rotational direction as the crank axle rotates about the first rotational axis in the second rotational direction, the second rotational direction being opposite the first rotational direction, and
   a torque combining mechanism operatively coupling the output shaft of the motor to the output member to transmit rotation of the output shaft of the motor to the output member, the torque combining mechanism being configured to operatively separate the output shaft of the motor from the output member for preventing rotation of the crank axle from being transmitted to the output shaft of the motor as the crank axle rotates about the first rotational axis in the second rotational direction.

2. The bicycle drive unit according to claim 1, wherein the output member is rotatable relative to the crank axle.

3. The bicycle drive unit according to claim 1, wherein the output member is configured to be attached to a front sprocket wheel.

4. The bicycle drive unit according to claim 1, wherein the torque combining mechanism includes a one-way clutch that is operatively disposed between the output shaft of the motor and the output member, the one-way clutch operatively coupling the output shaft of the motor to the output member as the crank axle rotates about the first rotational axis in the first rotational direction, and the one-way clutch operatively separating the output shaft of the motor from the output member for preventing the rotation of the crank axle from being transmitted to the output shaft of the motor as the crank axle rotates about the first rotational axis in the second rotational direction.

5. The bicycle drive unit according to claim 4, wherein the torque combining mechanism includes a torque transmission part rotatable about the first rotational axis, the torque transmission part being operatively coupled to the output shaft of the motor.

6. The bicycle drive unit according to claim 5, wherein the one-way clutch includes an engagement pawl pivotally arranged between a release position and an engagement position, the engagement pawl being configured to engage with a toothed portion of the torque transmission part of the torque combining mechanism as the crank axle rotates about the first rotational axis in the first rotational direction, the engagement pawl being configured to be disengaged from the toothed portion of the torque transmission part of the torque combining mechanism as the crank axle rotates about the first rotational axis in the second rotational direction.

7. The bicycle drive unit according to claim 6, wherein the one-way clutch further includes a biasing member biasing the engagement pawl towards the engagement position.

8. The bicycle drive unit according to claim 5, wherein the one-way clutch includes an engagement member pivotally arranged between a release position and an engagement position, the engagement member being configured to frictionally engage with an inner peripheral surface of the torque transmission part of the torque combining mechanism as the crank axle rotates about the first rotational axis in the first rotational direction, the engagement member being configured to be at least frictionally disengaged from the inner peripheral surface of the torque transmission part of the torque combining mechanism as the crank axle rotates about the first rotational axis in the second rotational direction.

9. The bicycle drive unit according to claim 8, wherein the one-way clutch further includes a biasing member biasing the engagement member towards the release position.

10. The bicycle drive unit according to claim 9, further comprising
a control part configured to move the engagement member towards the engagement position as the crank axle rotates about the first rotational axis in the first rotational direction.

11. The bicycle drive unit according to claim 10, further comprising
a contact part configured to transmit the rotation of the crank axle to the output member as the crank axle rotates about the first rotational axis in the second rotational direction.

12. The bicycle drive unit accord ng to claim 7, further comprising
a control part configured to move the engagement pawl towards the release position as the crank axle rotates about the first rotational axis in the second rotational direction.

13. The bicycle drive unit according to claim 12, further comprising:
a rotation transmitting member including the control part and an inside surface, the inside surface being arranged to contact a contact surface of a projection part of the output member to transmit the rotation of the crank axle to the output member as the crank axle rotates about the first rotational axis in the second rotational direction.

14. The bicycle drive unit according to claim 7, wherein the toothed portion is disposed on an inner peripheral surface of the torque transmission part of the torque combining mechanism.

15. The bicycle drive unit according to claim 7, wherein the toothed portion is disposed on an outer peripheral surface of the torque transmission part of the torque combining mechanism.

16. The bicycle drive unit according to claim 1, further comprising:
a rotation transmitting member non-rotatably coupled to the crank axle, the rotation transmitting member being arranged and configured to be rotatable relative to the output member within a limited range of relative rotation.

17. The bicycle drive unit according to claim 16, wherein
a plurality of recesses are circumferentially arranged on an inner peripheral surface of the rotation transmitting member, and a plurality of projections are circumferentially arranged on an outer peripheral surface of the output member, the recesses and projections being arranged and configured to contact one another and prevent relative rotation between the output member and the rotation transmitting member beyond the limited range.

18. The bicycle drive unit according to claim 5, further comprising:
a rotation transmitting member non-rotatably coupled to the crank axle, the rotation transmitting member being rotatable relative to the output member within a limited range of relative rotation,
the torque transmission part being rotatably supported on an outer peripheral surface of the rotation transmitting member.

* * * * *